(12) United States Patent
Omori et al.

(10) Patent No.: US 9,201,532 B2
(45) Date of Patent: Dec. 1, 2015

(54) INFORMATION INPUT DEVICE, INFORMATION INPUT PROGRAM, AND ELECTRONIC INSTRUMENT

(75) Inventors: Hideyuki Omori, Aichi (JP); Tsutomu Harada, Aichi (JP); Kazunori Yamaguchi, Kanagawa (JP); Yoshiharu Nakajima, Kanagawa (JP)

(73) Assignee: Japan Display Inc., Tokyo (JP)

( * ) Notice: Subject to any disclaimer, the term of this patent is extended or adjusted under 35 U.S.C. 154(b) by 1233 days.

(21) Appl. No.: 12/898,142

(22) Filed: Oct. 5, 2010

(65) Prior Publication Data
US 2011/0090158 A1 Apr. 21, 2011

(30) Foreign Application Priority Data
Oct. 15, 2009 (JP) ................ P2009-238426

(51) Int. Cl.
G06F 3/041 (2006.01)
G06F 3/042 (2006.01)

(52) U.S. Cl.
CPC .............. G06F 3/0412 (2013.01); G06F 3/042 (2013.01); G06F 3/0418 (2013.01)

(58) Field of Classification Search
CPC ..... G06F 3/0412; G06F 3/042; G06F 3/0418; G06F 3/0488; G06F 1/1603
USPC ...................... 345/173–178; 178/18.01–20.04
See application file for complete search history.

(56) References Cited

U.S. PATENT DOCUMENTS

| | | | | |
|---|---|---|---|---|
| 6,274,862 B1* | 8/2001 | Rieger | ..................... | 250/216 |
| 7,110,901 B2* | 9/2006 | Wada et al. | ............... | 702/86 |
| 7,190,336 B2 | 3/2007 | Fujisawa | | |
| 8,164,582 B2* | 4/2012 | North et al. | ................. | 345/178 |
| 2003/0025680 A1* | 2/2003 | Tsang | ..................... | 345/178 |
| 2003/0169239 A1* | 9/2003 | Nakano et al. | .......... | 345/173 |
| 2004/0076325 A1* | 4/2004 | Wada et al. | ............... | 382/154 |
| 2006/0170658 A1* | 8/2006 | Nakamura et al. | ........ | 345/173 |
| 2009/0002341 A1* | 1/2009 | Saito et al. | ............... | 345/175 |
| 2009/0021632 A1* | 1/2009 | Huggett | ................... | 348/349 |
| 2009/0109193 A1* | 4/2009 | Masalkar | ................ | 345/175 |
| 2009/0160815 A1* | 6/2009 | Steer | ......................... | 345/173 |
| 2010/0073326 A1* | 3/2010 | Keam et al. | ............... | 345/175 |
| 2013/0236051 A1* | 9/2013 | Chen et al. | ............... | 382/103 |

FOREIGN PATENT DOCUMENTS

JP 2004-127272 4/2004

* cited by examiner

Primary Examiner — Gregory J Tryder
(74) Attorney, Agent, or Firm — K&L Gates LLP

(57) ABSTRACT

An information input device includes: an input panel having an effective photo-detectable region in which a plurality of photodetectors are arranged for detecting an external proximity object, and having a shading region located in a margin of the effective photo-detectable region; a correction section performing outermost-region correction on an outermost photo-detection signal to increase intensity thereof, the outermost photo-detection signal being obtained from a photodetector located in an outermost-region of the effective photo-detectable region; and an image processor acquiring object information about one or more of a position, a shape and size of the external proximity object based on a resultant photo-detection signal obtained from the outermost-region correction.

3 Claims, 20 Drawing Sheets

EMBODIMENT

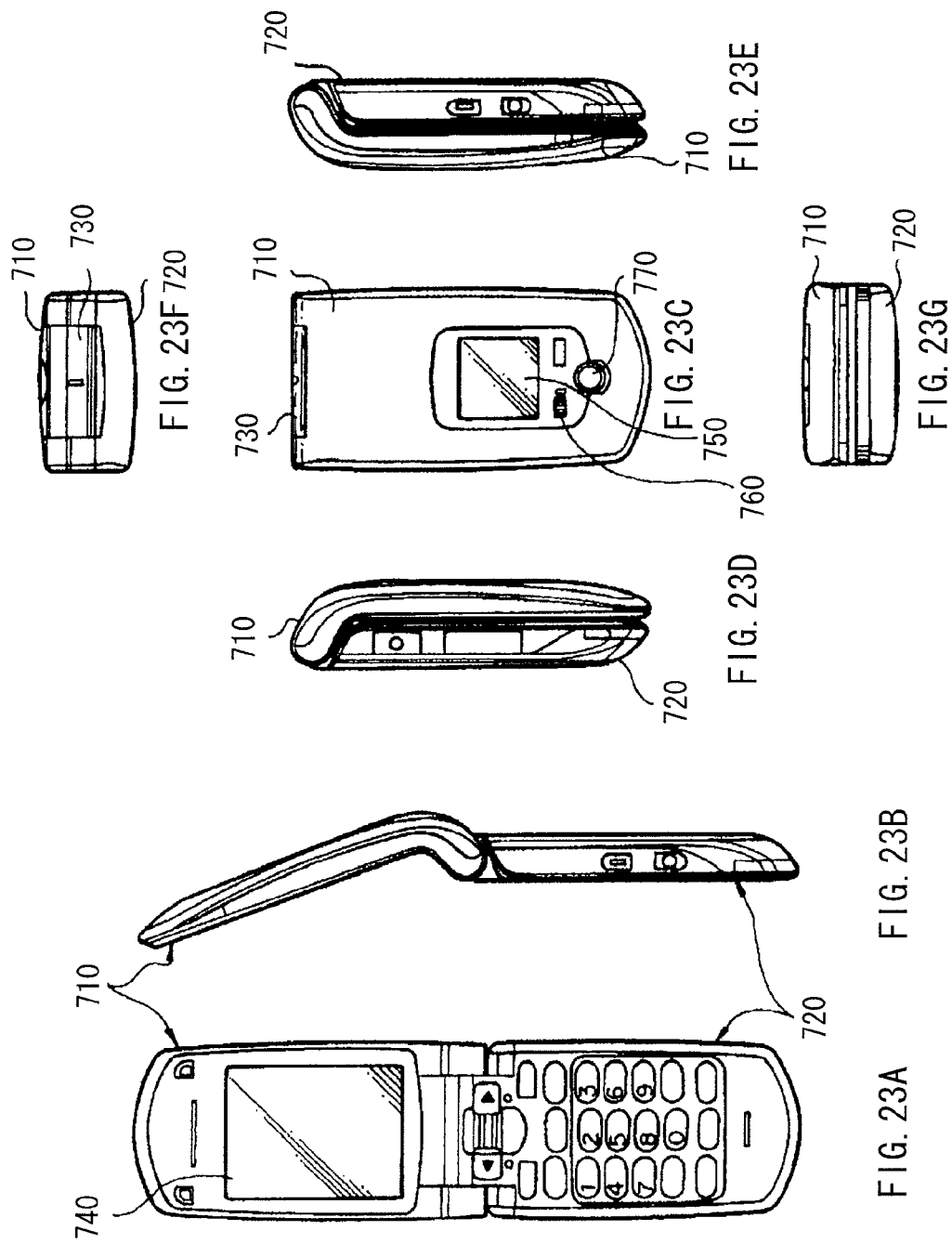

INFORMATION INPUT DEVICE, INFORMATION INPUT PROGRAM, AND ELECTRONIC INSTRUMENT

CROSS REFERENCES TO RELATED APPLICATIONS

The present application claims priority to Japanese Priority Patent Application JP 2009-238426 filed in the Japan Patent Office on Oct. 15, 2009, the entire content of which is hereby incorporated by reference.

BACKGROUND

The present application relates to an information input device and an information input program for inputting information of an external proximity object, and an electronic instrument having such an information input device.

Some image display devices have a touch panel. The touch panel includes a resistance touch panel using change in electric resistance, a capacitance touch panel using change in capacitance, and an optical touch panel that optically detects a finger or the like.

For example, the optical touch panel modulates light emitted from a backlight by liquid crystal elements to display an image on a display surface, and receives light, which has been output from the display surface and reflected by a proximity object such as a finger, by photodetectors arranged on the display surface to detect a position of the proximity object or the like. Such an image display device is described in Japanese Unexamined Patent Application Publication No. 2004-127272. The display device described in the Patent Application includes a display section having a display unit for displaying an image and an image pickup unit for taking an image of an object.

SUMMARY

In such an image display device, an effective display region (effective photo-detectable region) having display elements and photodetectors arranged therein, and a frame region in a margin (periphery) of the effective display region are typically provided in a display surface. Since a shading layer such as BM (Black Matrix) layer is formed in the frame region, the frame region acts as a shading region. This has led to a difficulty that each photodetector in an outermost-region of the effective display region is reduced in signal intensity of a photo-detection signal compared with a photo-detection signal obtained in an inner region due to a fact that light is not incident from a shading region side in the margin of the effective display region. This means reduction in in-plane evenness of photo-detection signal intensity in the effective display region. Such a difficulty is particularly significant in the case that a distance between a photo-detection surface and a touch surface of a proximity object is increased, for example, in the case that a protective glass or acrylic plate is attached on a display surface.

Therefore, when a proximity object is detected based on a photo-detection signal obtained in this way, the object has not been able to be accurately detected, leading to a possibility of a position detection error or the like. In other words, an information input device having the optical touch panel in the past has been hard to detect a proximity object with high accuracy, which has been necessary to be improved.

It is desirable to provide an information input device, an information input program, and an electronic instrument, which may detect a proximity object with high accuracy.

An information input device according to an embodiment of the application includes: an input panel having an effective photo-detectable region having a plurality of photodetectors arranged therein for detecting an external proximity object, and a shading region located in a margin of the effective photo-detectable region; a correction section performing outermost-region correction to an outermost-region photo-detection signal as a photo-detection signal obtained from a photodetector in an outermost-region of the effective photo-detectable region to increase intensity of the signal; and an image processor acquiring object information about one or more of a position, a shape and size of the external proximity object based on a photo-detection signal subjected to the outermost-region correction. The external proximity object mentioned herein is not limited to a literally approaching object, and includes a contacting object.

An information input program according to an embodiment of the application allows a computer to execute a step of using an input panel having an effective photo-detectable region having a plurality of photodetectors arranged therein for detecting an external proximity object, and a shading region located in a margin of the effective photo-detectable region to acquire an outermost-region photo-detection signal as a photo-detection signal obtained from a photodetector in an outermost-region of the effective photo-detectable region; a step of performing outermost-region correction to the outermost-region photo-detection signal to increase intensity of the signal; and a step of acquiring object information about one or more of a position, a shape and size of the external proximity object based on a photo-detection signal subjected to the outermost-region correction.

An electronic unit according to an embodiment of the application includes the information input device according to the embodiment of the application.

In the information input device, the information input program, and the electronic instrument according to the embodiments of the application, an input panel provides an outermost-region photo-detection signal as a photo-detection signal obtained from a photodetector in an outermost-region of the effective photo-detectable region. In addition, outermost-region correction is performed to the outermost-region photo-detection signal to increase intensity of the signal. In addition, object information of an external proximity object is acquired based on a photo-detection signal subjected to the outermost-region correction. Therefore, even if a photodetector in the outermost-region is reduced in signal intensity of a photo-detection signal compared with that of a photo-detection signal obtained in an inner region due to a fact that light is not incident from a shading region side in a margin of the effective photo-detectable region, such reduction in signal intensity may be suppressed.

According to the information input device, the information input program, and the electronic instrument of the embodiments of the application, outermost-region correction is performed to an outermost-region photo-detection signal obtained from a photodetector in an outermost-region of an effective photo-detectable region of an input panel to increase intensity of the signal, and object information of an external proximity object is acquired based on a photo-detection signal subjected to the outermost-region correction, which may suppress reduction in signal intensity of a photo-detection signal in the outermost-region compared with in an inner region due to presence of a shading region, leading to improvement in in-plane evenness of photo-detection signal intensity in an effective display region. Accordingly, object information of an external proximity object is acquired based on a photo-detection signal subjected to such outermost-region correction, and therefore a proximity object may be detected with high accuracy.

Additional features and advantages are described herein, and will be apparent from the following Detailed Description and the figures.

BRIEF DESCRIPTION OF THE FIGURES

FIG. 20A shows appearance of application example 2 as viewed from a surface side, and FIG. 20B shows appearance thereof as viewed from a back side.

FIGS. 23A to 23G are diagrams, where FIG. 23A is a front diagram of application example 5 in an opened state, FIG. 23B is a side diagram thereof, FIG. 23C is a front diagram thereof in a closed state, FIG. 23D is a left side diagram thereof, FIG. 23E is a right side diagram thereof, FIG. 23F is a top diagram thereof, and FIG. 23G is a bottom diagram thereof.

DETAILED DESCRIPTION

An embodiment of the present application will be described in detail hereinbelow with reference to the drawings.

Description is made in the following sequence.

1. Embodiment (example 1 of performing outermost-region correction processing and in-plane correction processing: using a reference area)

2. Modifications

Modification 1 (example 2 of performing outermost-region correction processing and in-plane correction processing: using reference lines)

Modification 2 (example 3 of performing outermost-region correction processing and in-plane correction processing: reversed order of correction processing)

Modification 3 (example of performing only outermost-region correction processing: example of not performing in-plane correction processing)

Modification 4 (example of providing an image processor within an electronic instrument body)

3. Application examples (application examples to electronic instruments)

4. Other modifications

1. EMBODIMENT

General Configuration Example of Information Input/Output Device

Figure 1:
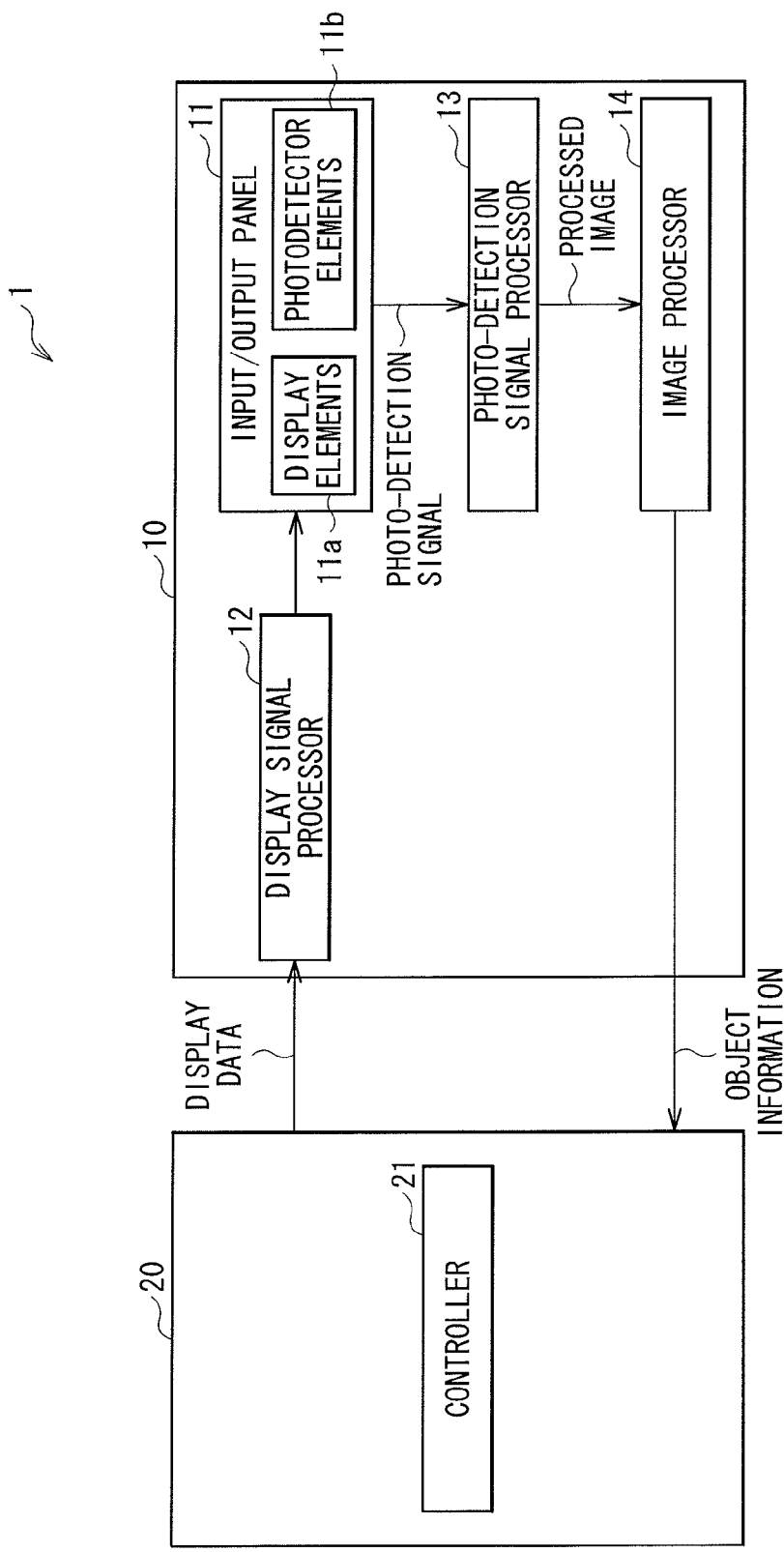
FIG. 1 is a block diagram showing a configuration of an information input/output device according to an embodiment of the application.
Figure 2:
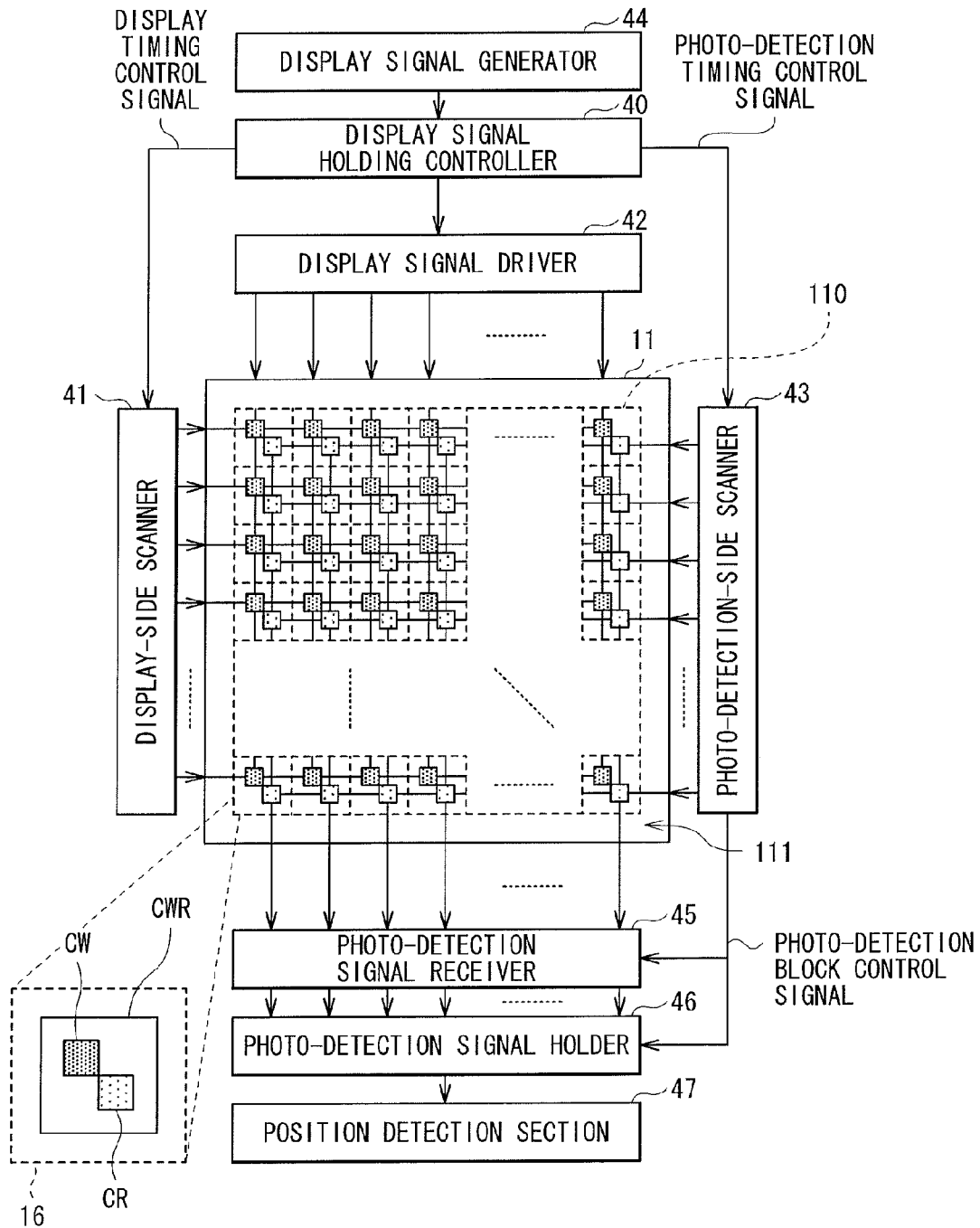
FIG. 2 is a block diagram showing the configuration of the information input/output device shown in FIG. 1 in detail.

FIG. 1 is a block diagram showing a schematic configuration of an information input/output device 1 according to an embodiment of the application, and FIG. 2 is a block diagram showing a detailed configuration of the information input/output device 1.

The information input/output device 1 has a display 10 and an electronic instrument body 20 using the display 10 as shown in FIG. 1. The display 10 has an input/output panel 11, a display signal processor 12, a photo-detection signal processor 13, and an image processor 14, and the electronic instrument body 20 has a controller 21.

Input/Output Panel 11

The input/output panel 11 has display elements 11a and photodetectors 11b as shown in FIG. 1. The input/output panel 11 includes a liquid crystal display panel in which a plurality of pixels 16 are arranged in a matrix within an effective display region 110 (combined with an effective photo-detectable region), for example, as shown in FIG. 2. A frame region (peripheral region, or shading region) as a region having no pixels 16 arranged therein are provided in the periphery (margin) of the effective display region 110.

The display elements 11a are liquid crystal elements as display elements that use light emitted from a backlight as a light source (backlight 30 described later) to display an image such as a figure or letter on a display surface. The photodetectors 11b are photodetectors (photo-detecting sensors 314 described later), for example, photodiodes, each of which receives light and thus outputs an electric signal. In the embodiment, the photodetectors 11b are disposed for respective pixels 16 to be plurally arranged in a plane.

In the input/output panel 11, a display/photo-detection cell CWR is provided in each pixel 16. Each display/photo-detection cell CWR has a display cell CW and a photo-detection cell CR. The display cell CW includes a liquid crystal cell as the display element 11a, and the photo-detection cell CR includes a photodetector as the photodetector 11b.

Figure 3:
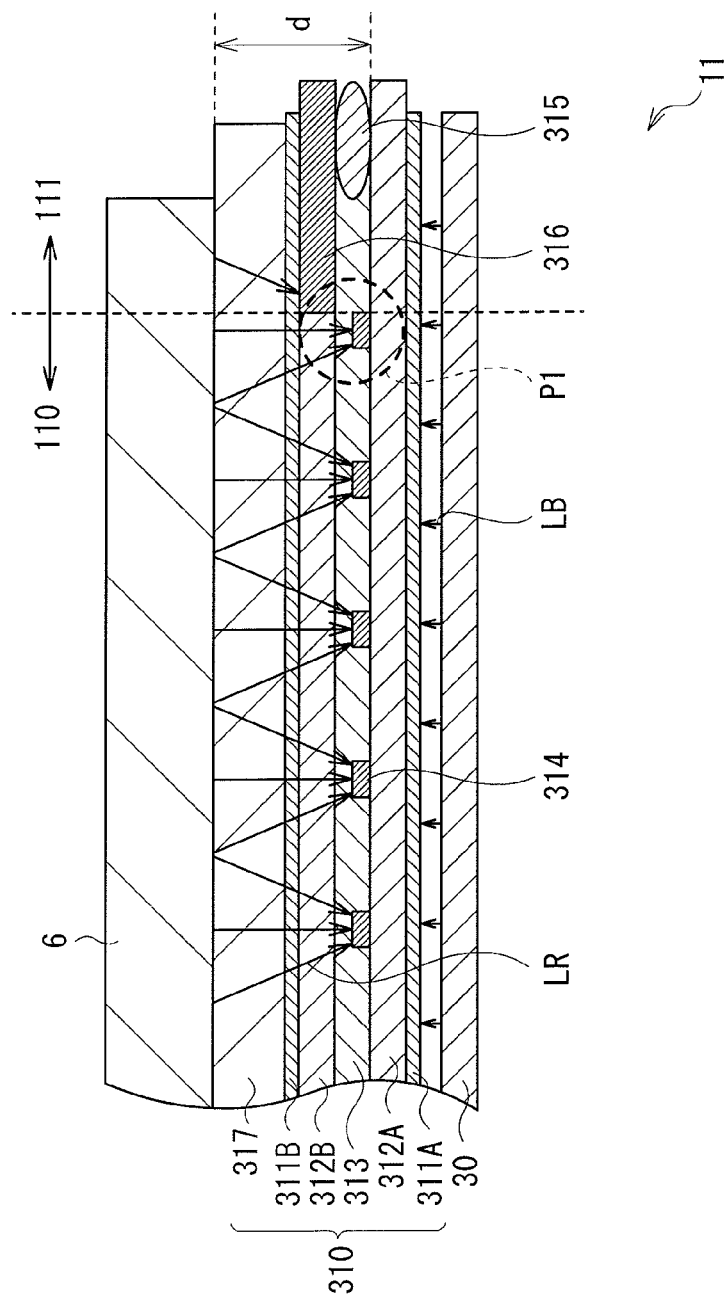
FIG. 3 is a section diagram showing a configuration of an input/output panel shown in FIG. 2 in detail.

FIG. 3 is a sectional view showing a sectional configuration example near a boundary between the effective display region 110 and the frame region 111 of the input/output panel 11. The input/output panel 11 is configured of the backlight 30 and a liquid crystal panel 310. The backlight 30 emits backlight light LB used in image display, and furthermore, acts as a light source (detection light source) emitting light (detection light; for example, invisible light such as infrared light) for detecting an external proximity object 6 such as a finger. The liquid crystal panel 310 has a structure where a liquid crystal layer 313 is sealed between a TFT (Thin Film Transistor) substrate 312A and a CF (Color Filter) substrate 312B by a sealer 315. More specifically, the liquid crystal panel 310 has a polarizing plate 311A, the TFT substrate 312A, the photo-detecting sensors 314, the liquid crystal layer 313, the CF substrate 312B, a polarizing plate 311B, and a protective glass 317 in order from a backlight 30 side. The frame region 111 of the CF substrate 312B has a BM (Black Matrix) layer 316 as a shading layer thereon, so that the frame region 111 acts as a shading region. Among these components, the photo-detecting sensor 314 configure the photodetector 11b, which, for example, receives reflected light LR, the light having been emitted from the backlight 30 (as backlight light LB) and reflected by the external proximity object 6 and returned, and thus outputs a photo-detection signal.

Display Signal Processor 12

The display signal processor 12 is connected as a preceding stage to the input/output panel 11, and drives the panel 11 so that the panel 11 displays an image based on display data. The display signal processor 12 has a display signal holding controller 40, a display-side scanner 41, a display signal driver 42, and a photo-detection-side scanner 43 as shown in FIG. 2.

The display signal holding controller 40 stores display signals output from a display signal generator 44 into a field memory configured of SRAM (Static Random Access Memory) or the like for each screen (for each field display), and holds the signal in the memory. In addition, the display signal holding controller 40 has a function of controlling the display-side scanner 41 for driving each display cell CW, the display signal driver 42, and the photo-detection-side scanner 43 for driving each photo-detection cell CR such that the scanners and the driver operate in conjunction with one another. Specifically, the controller 40 outputs a display timing control signal to the display-side scanner 41, a photo-detection timing control signal to the photo-detection-side scanner 43, and a control signal and a display signal corresponding to one horizontal line based on a display signal held in the field memory to the display signal driver 42. The input/output panel 11 performs line sequential operation according to the control signals and the display signals.

The display-side scanner 41 has a function of selecting a display cell CW as a drive target according to the display timing control signal output from the display signal holding controller 40. Specifically, the scanner 41 supplies a display selection signal via a display gate line connected to each pixel 16 in the input/output panel 11 to control a display element selection switch. In other words, when a voltage is applied to a pixel 16 by the display selection signal so that a display element selection switch of the pixel 16 is turned on, the pixel 16 performs display operation with luminance corresponding to a voltage supplied from the display signal driver 42.

The display signal driver 42 has a function of supplying display data to a display cell CW as a drive target according to a display signal corresponding to one horizontal line output from the display signal holding controller 40. Specifically, the driver 42 supplies a voltage corresponding to display data to a pixel 16 selected by the display-side scanner 41 via a data supply line connected to each pixel 16 in the input/output panel 11. The display-side scanner 41 and the display signal driver 42 perform line sequential operation in conjunction with each other in this way, so that an image corresponding to optional display data is displayed on the input/output panel 11.

The photo-detection-side scanner 43 has a function of selecting a photo-detection cell CR (photo-detecting sensor 314) as a drive target according to a photo-detection timing control signal output from the display signal holding controller 40. Specifically, the scanner 43 supplies a photo-detection selection signal via a photo-detection gate line connected to each pixel 16 in the input/output panel 11 to control a photodetector selection switch. In other words, like the operation of the display-side scanner 41, when a voltage is applied to a pixel 16 by the photo-detection selection signal so that a photodetector selection switch of the pixel 16 is turned on, a photo-detection signal is output from a photo-detecting sensor 314 of the pixel 16 to a photo-detection signal receiver 45. Thus, the photo-detection cell CR may receive and detect light (reflected light LR) reflected by a contacting or proximity object (external proximity object 6) based on emitted light from a display cell CW. In addition, the photo-detection-side scanner 43 outputs a photo-detection block control signal to the photo-detection signal receiver 45 and a photo-detection signal holder 46. In other words, the photo-detection-side scanner 43 further has a function of controlling a block responsible for such photo-detection operation. In the information input/output device 1 of the embodiment, the display gate line and the photo-detection gate line are separately connected to each display/photo-detection cell CWR, so that the display-side scanner 41 and the photo-detection-side scanner 43 may operate independently.

Photo-Detection Signal Processor 13

Figure 4:
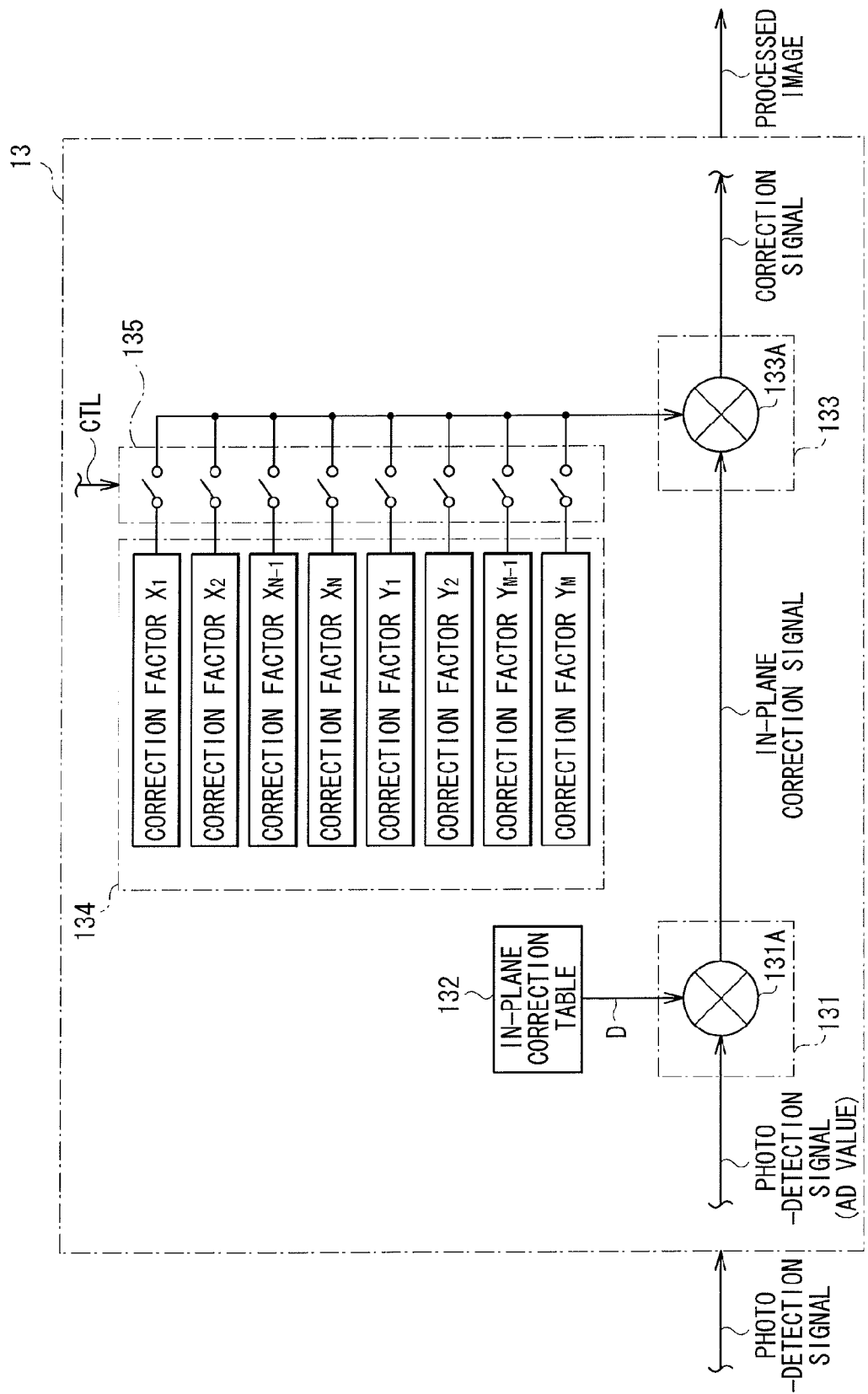
FIG. 4 is a block diagram showing a detailed configuration of a photo-detection signal processor shown in FIG. 1.
Figure 5:
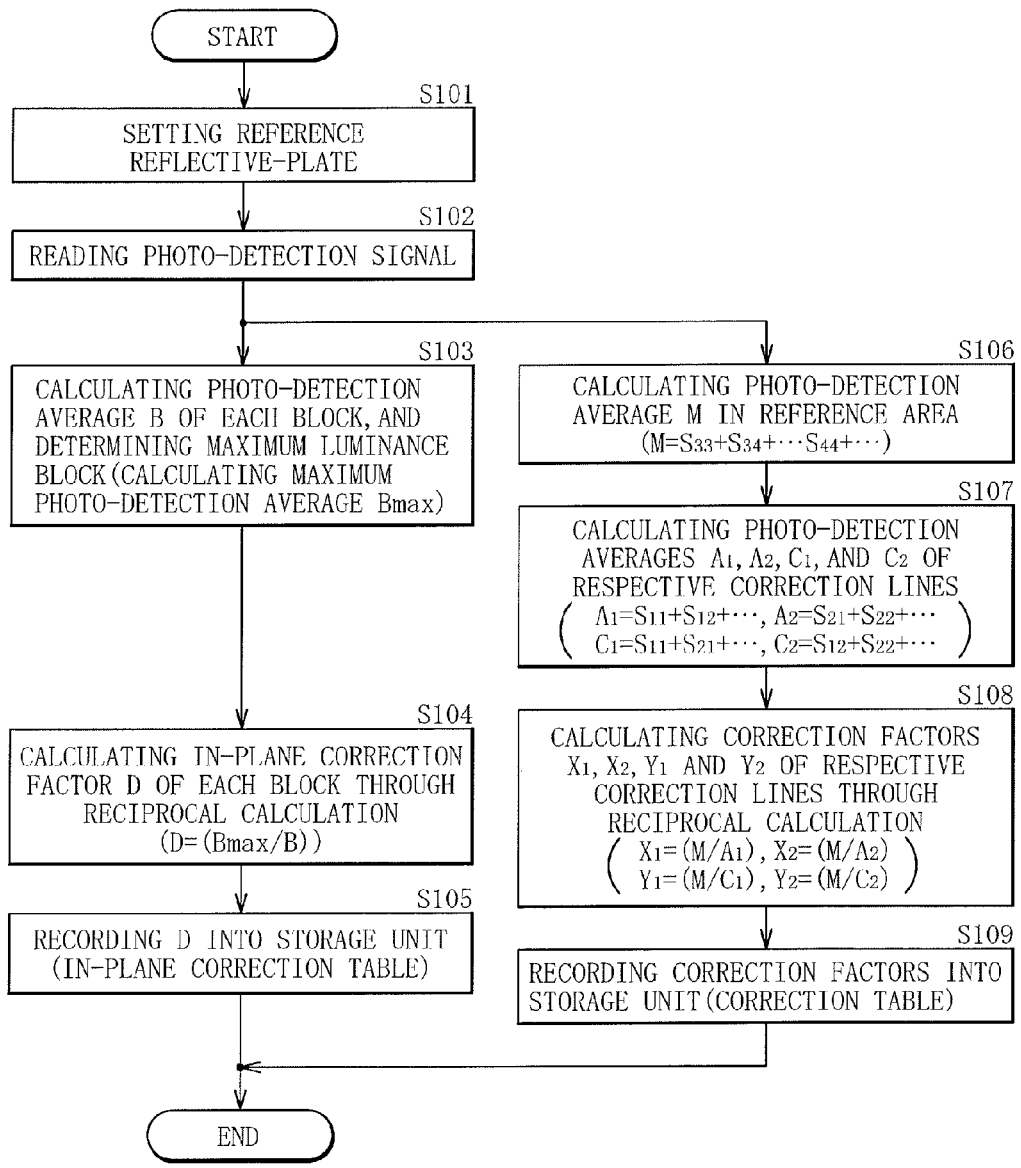
FIG. 5 is a flowchart showing a method of creating an in-plane correction table and an correction table according to the embodiment.

The photo-detection signal processor 13 shown in FIG. 1 is connected as a subsequent stage to the input/output panel 11 so as to take a photo-detection signal (pickup image) from each of the photodetectors 11b (photo-detecting sensors 314). Thus, the photo-detection signal processor 13 performs signal processing including predetermined correction processing described later. The photo-detection signal processor 13 includes the photo-detection signal receiver 45 and the photo-detection signal holder 46 as shown in FIG. 2, and outputs a processed image (corrected image) as an image that has been subjected to the above signal processing. A detailed configuration of the photo-detection signal processor 13 will be described later (FIGS. 4 and 5).

The photo-detection signal receiver 45 has a function of acquiring a photo-detection signal corresponding to one horizontal line from each photo-detection cell (photo-detecting sensor 314) according to a photo-detection block control signal output from the photo-detection-side scanner 43. Such a photo-detection signal is output to the photo-detection signal receiver 45 via a photo-detection signal output line. The photo-detection signal acquired by the photo-detection signal receiver 45 is output to the photo-detection signal holder 46.

The photo-detection signal holder 46 reconstructs the photo-detection signal output from the photo-detection signal receiver 45 into a photo-detection signal for each screen (for each field display) according to the photo-detection block control signal output from the photo-detection-side scanner 43. The photo-detection signal reconstructed in this way is stored into a field memory configured of SRAM or the like, and held therein. Data of the photo-detection signal stored in the photo-detection signal holder 46 are output to the image processor 14.

Image Processor 14

The image processor 14 shown in FIG. 1 is connected as a subsequent stage to the photo-detection signal processor 13 so as to take a processed image from the processor 13, and performs processing such as binarization, noise removal and labeling described later. Thus, object information of the external proximity object 6, namely, information about one or more of barycenter of the object 6, central coordinates thereof, and area (size or shape) thereof may be obtained. Specifically, the image processor 14 performs signal processing based on label information obtained by a labeling processor, position information, area information and the like to specify a position or the like of the external proximity object 6.

Electronic Instrument Body 20

The electronic instrument body 20 shown in FIG. 1 outputs display data to the display signal processor 12 in the display 10, and receives object information from the image processor 14.

The controller 21 has a function of, for example, using the object information to change a display image, and is configured of CPU (Central Processing Unit) or the like. The controller 21 has the display signal generator 44 shown in FIG. 2. The display signal generator 44 is configured of CPU (not shown) or the like, and, for example, generates a display signal for displaying an image for each screen (each field display) based on supplied image data, and outputs the display signal to the display signal holding controller 40.

Detailed Configuration Example of Photo-Detection Signal Processor 13

Next, a detailed configuration example of the photo-detection signal processor 13 is described with reference to FIG. 4. FIG. 4 is a block diagram showing a detailed configuration of the photo-detection signal processor 13.

The photo-detection signal processor 13 includes an in-plane correction section 131, an in-plane correction table 132, a correction section 133, a correction table 134, and a SW (Switch) section 135. The in-plane correction section 131 and the correction section 133 correspond to a specific example of "correction section" of the application.

The in-plane correction section 131 performs in-plane correction (in-plane unevenness correction) processing described later to an AD value (photo-detection signal subjected to AD (Analog-to-Digital) conversion described later) of a photo-detection signal from the photo-detecting sensor 314 by using the in-plane correction table 132, and thus generates an in-plane-corrected signal. The in-plane correction section 131 has a multiplier 131A that multiplies the photo-detection signal (AD value) by an in-plane correction factor (in-plane correction factor D described later) supplied from the in-plane correction table 32 to generate the in-plane-corrected signal.

The in-plane correction table 132 is created by using a reference reflective-plate described later, and has a plurality of in-plane correction factors. The in-plane correction table 132 is a correction table for compensating in-plane luminance distribution of the backlight 30 and difference in photo-detection sensitivity between respective photodetectors 11b (photo-detecting sensors 314). Such an in-plane correction table 132 is stored in a memory (not shown). The in-plane correction table 132 will be described in detail later.

The correction section 133 performs outermost-region correction (outermost-region sensitivity correction) processing described later to a photo-detection signal (in-plane-corrected signal), which has been subjected to in-plane correction by the in-plane correction section 131, by using the correction table 134, and thus generates a corrected signal. Specifically, in this outermost-region correction processing, an in-plane-corrected signal corresponding to a photo-detection signal (outermost-region photo-detection signal) obtained from a photodetector 11b (photo-detecting sensor 314) in an outermost-region of the effective photo-detectable region 110 of the input/output panel 11 is subjected to correction processing to increase signal intensity of the in-plane-corrected signal. More specifically, for example, outermost-region correction processing is performed such that signal intensity of the outermost-region photo-detection signal is approximately the same as (preferably, equal to) signal intensity of a photo-detection signal (inner photo-detection signal) obtained from a photodetector in an inner region (central region) of the effective photo-detectable region 110. The outermost-region mentioned herein includes an upper-outermost region, a lower-outermost region, a left-outermost region, and a right-outermost region of the effective display region 110. In other words, the correction section 133 performs outermost-region correction processing for the upper-outermost, lower-outermost, left-outermost, or right-outermost region as the outermost-region of the effective display region 110, respectively.

The correction section 133 has a multiplier 133A that multiplies the in-plane-corrected signal by a correction factor (correction factor X1, Y1 or the like described later) supplied from the correction table 134 to generate a corrected signal. In other words, the correction section 133 multiplies the in-plane-corrected signal by the correction factor to perform outermost-region correction processing (generate a corrected signal). In the image processor 13, a processed image is formed based on the corrected signal.

The correction table 134 is created by using the reference reflective-plate described later like the in-plane correction table 132, and has a plurality of correction factors. Here, the correction table 134 has eight correction factors $X_1, X_2, X_{N-1}, X_N, Y_1, Y_2, Y_{M-1}$ and $Y_M$ (N and M are, for example, a natural number of 5 or more). Specifically, the correction factors $X_1$ and $X_2$ are correction factors for the upper-outermost region of the outermost-region of the effective display region 110, and the correction factors $X_{N-1}$ and $X_N$ are correction factors for the lower-outermost region of the outermost-region of the region 110. The correction factors $Y_1$ and $Y_2$ are correction factors for the left-outermost region of the outermost-region of the effective display region 110, and the correction factors $Y_{M-1}$ and $Y_M$ are correction factors for the right-outermost region of the outermost-region of the region 110. In other words, the correction table 134 is configured with each position in the outermost-region (upper-outermost region, lower-outermost region, left-outermost region, and right-outermost region) of the effective display region 110 being set in correspondence to each correction factor. Such a correction table 134 is stored in a memory (not shown). The correction table 134 will be described in detail later.

The SW section 135 has a plurality of SW for connecting/disconnecting between a supply line of each correction factor within the correction table 134 (here, the correction factors $X_1, X_2, X_{N-1}, X_N, Y_1, Y_2, Y_{M-1}$ and $Y_M$) and an input line to the multiplier 133A within the correction section 133. The SW is controlled to be on or off by, for example, a control signal CTL showing positional information of a photodetector 11b (photo-detecting sensor 314) in the effective display region 110.

Detailed Configuration Example of Correction Table (Example of Method of Creating Correction Table)

Next, a detailed configuration of each of the in-plane correction table 132 and the correction table 134 is described with reference to FIGS. 5 to 9. FIG. 5 is a flowchart showing an example of a method of creating each of the in-plane correction table 132 and the correction table 134. Here, description is made on a case where a block (group) 15 including a plurality of (four) photodetectors 11b included in a plurality of (four) display/photo-detection cells CWR are used as one correction unit for in-plane correction.

Acquisition of Photo-Detection Signal: S101, S102

First, a reference reflective-plate (not shown) having a uniform in-plane reflective index is disposed opposite the input/output panel 11 so as to cover the whole surface of the panel (step S101 of FIG. 5). In this state, all the display cells CW (liquid crystal cells) as the display elements 11a are made into a white display state (highest gray level state) according to a display signal from the display signal processor 12 so that approximately all emitted light from the backlight 30 is output from a display surface. Then, such output light from the display surface is reflected by the reference reflective-plate, and such reflected light is received by each photo-detecting sensor 314 as each photodetector 11b.

However, in this case, the display cells CW of all colors, R (red), G (green) and B (blue), may be made into the highest gray level state for literal white display (white display in a narrow sense). Alternatively, it is acceptable that only a display cell of a particular color (for example, R) is made into the highest gray level state (white display in a wide sense), and display cells of other two colors (for example, G and B) are made into the lowest gray level state (black display in a wide sense). A liquid crystal cell transmits infrared light regardless of a state (open or closed state) of the relevant liquid crystal. Therefore, when an infrared light selective transmission filter (not shown) is provided on each photo-detecting sensor 314, even if a liquid crystal cell is made into a black display state, infrared light contained in light from the backlight 30 may be used for the described light-reflection or photo-detection.

Next, a photo-detection signal output from each photo-detecting sensor 314 of each photodetector 11b is read (step S102). The photodetector 11b used in the embodiment is disposed for each pixel 16. Therefore, here, a correction factor for in-plane correction (in-plane correction factor D described later) is obtained for each of the blocks 15 in order to decrease capacitance of the memory for storing the in-plane correction table 132.

Figures 6, 7:
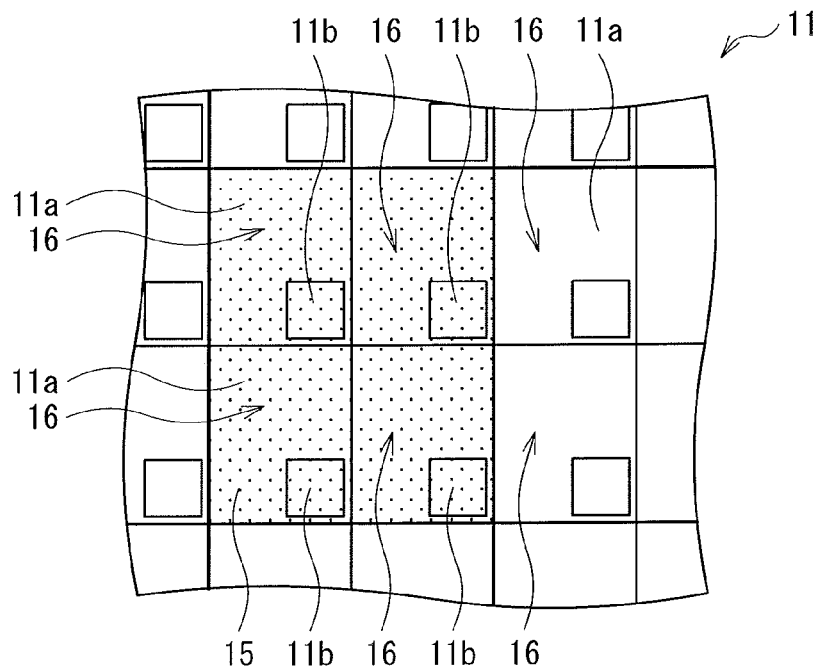
FIG. 6 is a schematic plan diagram for illustrating a case where a plurality of photodetectors is divided into a plurality of blocks (groups).
FIG. 7 is a diagram schematically showing an example of the in-plane correction table.

For example, a block 15 is configured of 2-by-2 4 pixels 16 adjacent in row and column directions among pixels 16 arranged in row and column directions as shown in FIG. 6. Thus, the photodetectors 11b disposed in the respective pixels 16 are divided into a plurality of blocks 15, and each block 15 forms a photodetector group. Such a block 15 may be configured of other number (for example, 3 by 3, 2 by 4, or 4 by 4) of photodetectors 11b instead of the 2-by-2 photodetectors 11b (pixels 16) as shown in FIG. 6.

Hereinafter, a step of creating/recording the in-plane correction table 132 (steps S103 to S105) and a step of creating/recording the correction table 134 (steps S106 to S109) are described individually because the steps are carried out in parallel.

Creation/Recording of in-Plane Correction Table: S103 to S105

First, a method of creating/recording the in-plane correction table 132 is described. First, photo-detection average B as an average signal level of photo-detection signals (signal intensity: AD value) output from the photodetectors 11b configuring each block 15 is obtained through calculation. In other words, photo-detection intensity average of reflected light is obtained for each block 15, and the obtained average is assumed to be the photo-detection average B. In addition, a maximum value of the obtained photo-detection average B of a plurality of blocks 15 is assumed to be the maximum photo-detection average Bmax. In other words, a maximum luminance block is determined (step S103).

Next, reciprocal calculation is performed to obtain a reciprocal of a normalized value obtained by dividing the photo-detection average B of each block 15 obtained in this way by the maximum photo-detection average Bmax, and a value obtained as a result of the calculation is assumed to be the in-plane correction factor D. In other words, the in-plane correction factor D as a correction factor for in-plane correction processing is obtained through reciprocal calculation shown by the following equation (1) (step S104).

$$D=(Bmax/B) \quad (1)$$

Since the normalized value is necessarily 1.0 or less, the in-plane correction factor D as the reciprocal thereof is necessarily 1.0 or more. Therefore, memory capacity for storage can be reduced compared with a case where the in-plane correction factor D is 1.0 or less. Moreover, it is typically likely to be rare that variation in in-display-surface luminance distribution of the backlight 30 or variation in photo-detection sensitivity between the photodetectors 11b is extremely large. Therefore, the photo-detection average B of each block 15 is slightly smaller than the maximum photo-detection average Bmax, and therefore a value of the in-plane correction factor D as a result of the reciprocal calculation is necessarily within a comparatively narrow range of slightly larger than 1.0. Therefore, even in this regard, memory capacity for storage can be reduced as described later.

In this way, the reciprocal calculation of step S104 is performed for each block 15, so that in-plane correction factors D are obtained for all blocks 15. Thus, for example, an in-plane correction table 132 as shown in FIG. 7 is obtained, which is then recorded in the memory (step S105). This is the end of creation of the in-plane correction table 132.

Figure 8:
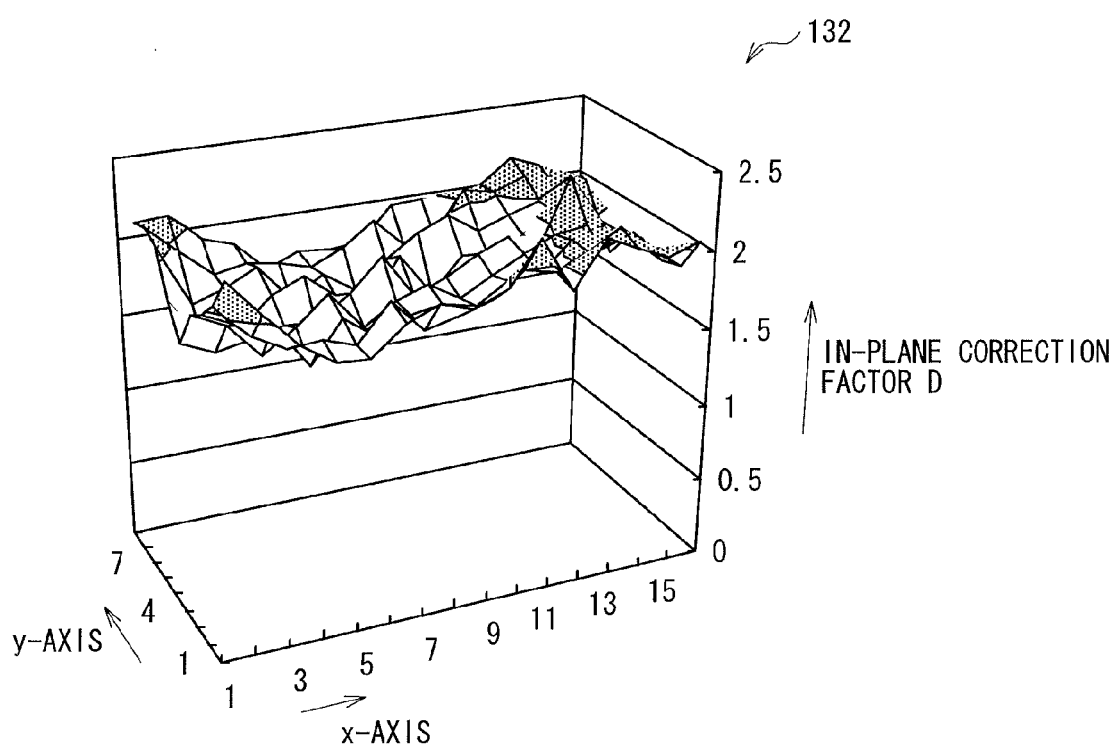
FIG. 8 is a diagram three-dimensionally showing an example of the in-plane correction table.

The in-plane correction table 132 shown in FIG. 7 is given in the case that groups are formed in row and column directions of a display surface, namely, in x-axis and y-axis directions with numbers of x=1, 2, 3, ... N in an x-axis direction, and y=1, 2, 3, ... M in a y-axis direction. In-plane correction factors $D_{11}, D_{21}, \ldots, D_{NM}$ are obtained for the respective groups. The in-plane correction table 132 is stereographically illustrated as shown in FIG. 8. In a schematic diagram of FIG. 8, a bottom surface corresponds to a display surface of the input/output panel 11, and a height direction indicates the in-plane correction factor D. In this way, in the embodiment, a plurality of photodetectors 11b (pixels 16) are grouped so that an in-plane correction factor D is provided for each block 15 instead of providing an in-plane correction factor D for each photodetector 11b (pixel 16). Thus, the number of in-plane correction factors D may be decreased, and consequently memory capacity for storage can be reduced.

Creation/Recording of Correction Table: S106 to S109

Figure 9:
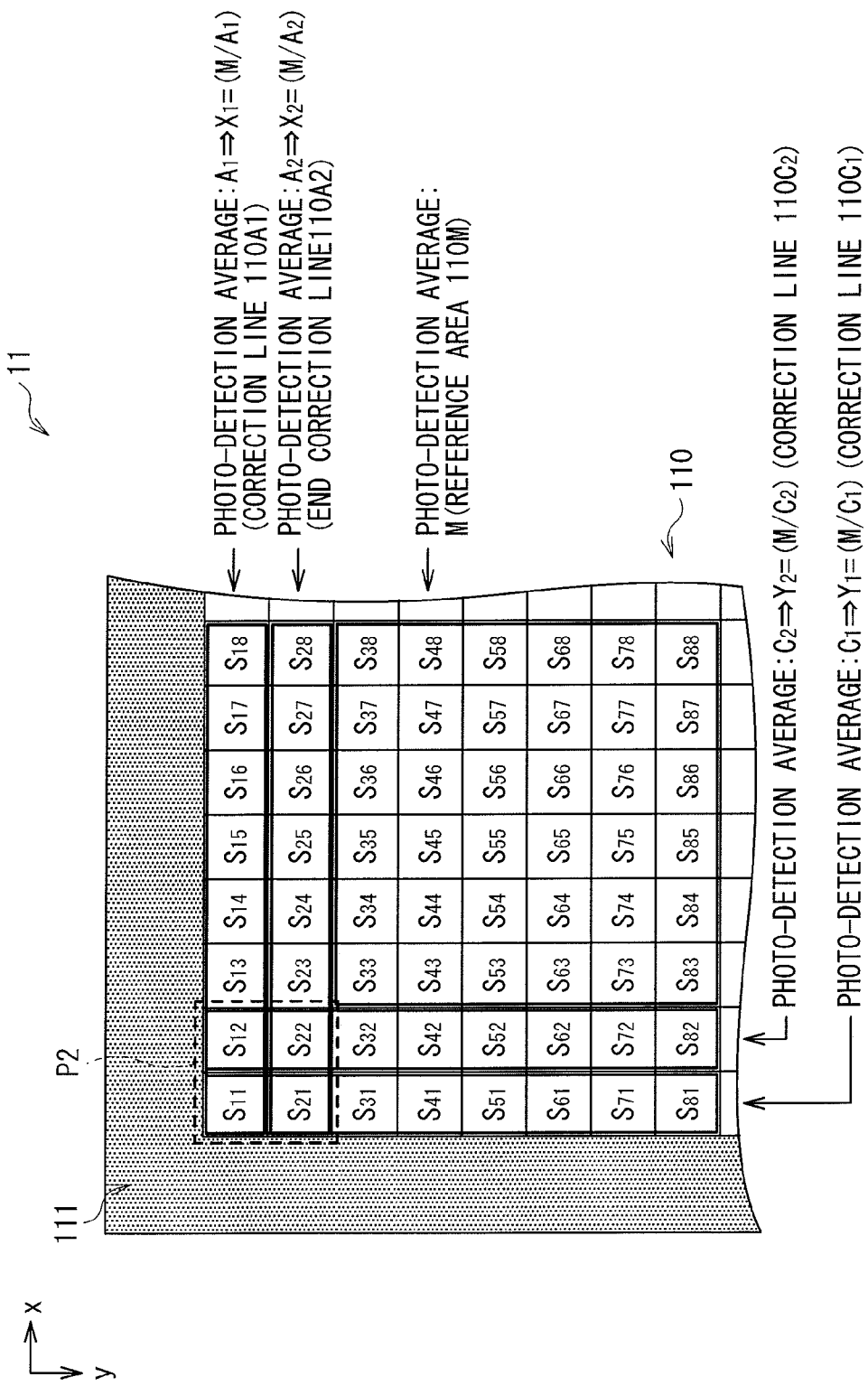
FIG. 9 is a schematic plan diagram for illustrating a summary of outermost-region correction according to the embodiment.

Next, a method of creating/recording the correction table 134 is described with reference to FIG. 9. FIG. 9 is a schematic plan diagram showing a summary of outermost-region correction processing of the embodiment. In the outermost-region correction processing, as described above, correction processing is performed for the outermost-region (upper-outermost region, lower-outermost region, left-outermost region, and right-outermost region) of the effective display region 110 of the input/output panel 11. FIG. 9 shows a partial region corresponding to an upper left outermost-region of the input/output panel 11, illustrating outermost-region correction processing for the upper-outermost region and the left-outermost region of the effective display region 110. While not shown, outermost-region correction processing for another outermost-region of the effective display region 110 is the same as the following processing. In the figure, symbols $S_{11}$, $S_{12}$, . . . indicate photo-detection signals (AD values) obtained by the photodetectors 11b (pixels 16), respectively.

In the upper left outermost-region of the effective display region 110, two photo-detection lines (correction lines 110A1 and 110A2) as an upper-outermost region of the outermost-region, and two photo-detection lines (correction lines 110C1 and 110C2) as a left-outermost region thereof are provided. The correction lines 110A1 and 110A2 are photo-detection lines extending along an x-axis direction (horizontal direction), and the correction lines 110C1 and 110C2 are photo-detection lines extending along a y-axis direction (vertical direction). In other words, outermost-region correction processing is independently performed in a photo-detection line along the horizontal or vertical direction of the input/output panel 11 in each outermost-region (upper-outermost region, lower-outermost region, left-outermost region, or right-outermost region).

An inner region (central region) located inside the outermost-region of the effective display region 110 has a reference area 110M as a reference region for obtaining the following correction factor. The reference area 110M is set to be the whole of the inner region of the effective display region 110 as shown in FIG. 9.

When the correction table 134 is created/recorded, first, photo-detection average M as intensity average of photo-detection signals (AD values) output from the photodetectors 11b (pixels 16) in the reference area 110M is obtained through calculation using the following equation (2) (step S106).

$$M = (S_{33} + S_{34} + \ldots + S_{43} + S_{44} + \ldots S_{83} + S_{84} + \ldots) \quad (2)$$

Next, photo-detection averages $A_1$, $A_2$, $C_1$ and $C_2$ as intensity average of photo-detection signals (AD values) output from the photodetectors 11b (pixels 16) in each correction line 110A1, 110A2, 110C1 and 110C2 is obtained. Specifically, the photo-detection average is obtained through calculation using the following equations (3) to (6) (step S107).

$$A_1 = (S_{11} + S_{12} + S_{13} + S_{14} + \ldots) \quad (3)$$

$$A_2 = (S_{21} + S_{22} + S_{23} + S_{24} + \ldots) \quad (4)$$

$$C_1 = (S_{11} + S_{21} + S_{31} + S_{41} + \ldots) \quad (5)$$

$$C_2 = (S_{12} + S_{22} + S_{32} + S_{42} + \ldots) \quad (6)$$

Next, reciprocal calculation is performed to obtain a reciprocal of a normalized value obtained by dividing each photo-detection average $A_1$, $A_2$, $C_1$ and $C_2$ in the correction lines 110A1, 110A2, 110C1 and 110C2 obtained in this way by the photo-detection average M in the reference area 110M. Values obtained as a result of the reciprocal calculation are assumed to be correction factors $X_1$, $X_2$, $Y_1$ and $Y_2$ for the correction lines 110A1, 110A2, 110C1 and 110C2, respectively. In other words, the correction factors $X_1$, $X_2$, $Y_1$ and $Y_2$ as correction factors for outermost-region correction processing are obtained through reciprocal calculation shown by the following equations (7) to (10) (step S108). As known from this, the correction factors $X_1$, $X_2$, $Y_1$ and $Y_2$ are defined by a ratio of the photo-detection average M in the reference area 110M to the photo-detection averages $A_1$, $A_2$, $C_1$ and $C_2$ in the correction lines 110A1, 110A2, 110C1 and 110C2, respectively.

$$X_1 = (M/A_1) \quad (7)$$

$$X_2 = (M/A_2) \quad (8)$$

$$Y_1 = (M/C_1) \quad (9)$$

$$Y_2 = (M/C_2) \quad (10)$$

Next, the correction factors $X_1$, $X_2$, $Y_1$ and $Y_2$ obtained in this way are recorded in the memory (step S109). This is the end of creation of the correction table 134. In this way, the correction table 134 is configured with each correction factor being set in correspondence to each photodetector 11b (pixel 16).

Operation and Effects of Information Input/Output Device

Figure 10:
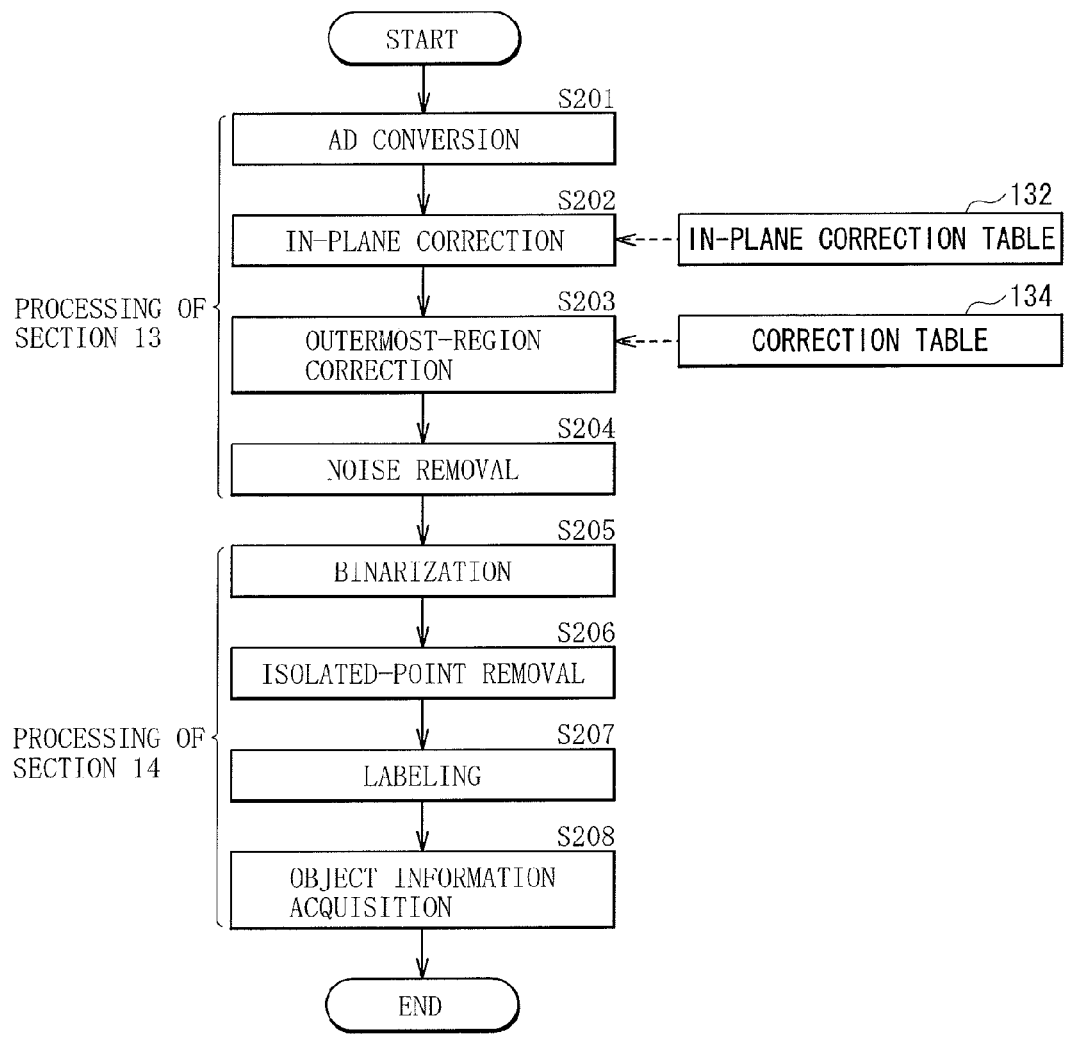
FIG. 10 is a flowchart showing an example of acquisition processing of object information according to the embodiment.

Next, operation and effects of the information input/output device 1 in the embodiment is described. FIG. 10 is a flowchart showing acquisition processing of object information of the information input/output device 1.

Acquisition of Photo-Detection Signal: S201

First, as shown in FIG. 1, display data output from the electronic instrument body 20 are input into the display signal processor 12. Then, the display signal processor 12 drives the input/output panel 11 such that an image is displayed on the panel based on the display data.

In the input/output panel 11, while an image is displayed on the display elements 11a with emitted light (backlight light LB) from the backlight 30, the photodetectors 11b are driven to receive light. As shown in FIG. 3, when an external proximity object 6 such as a finger contacts to or approaches a display element 11a, an image displayed on the display element 11a is reflected by the object 6, and reflected light LR is detected by a photo-detecting sensor 314 as a photodetector 11b. Upon such detection, the photo-detecting sensor 314 as the photodetectors 11b outputs a photo-detection signal.

Next, as shown in FIG. 1, the photo-detection signal processor 13 performs A/D conversion (analog-to-digital conversion) to the photo-detection signal to acquire a digital signal (AD value) of the photo-detection signal (step S201 of FIG. 10).

In-Plane Correction (In-Plane Unevenness Correction) Processing: S202)

Next, as shown in FIG. 4, the in-plane correction section 131 in the photo-detection signal processor 13 performs in-plane correction (in-plane unevenness correction) processing using the in-plane correction table 132 to the photo-detection signal (AD value) obtained in this way, and thus generates an in-plane-corrected signal (step S202). Specifically, the section 131 multiplies the photo-detection signal (AD value) by the in-plane correction factor D to generate the in-plane-corrected signal.

Figure 11:
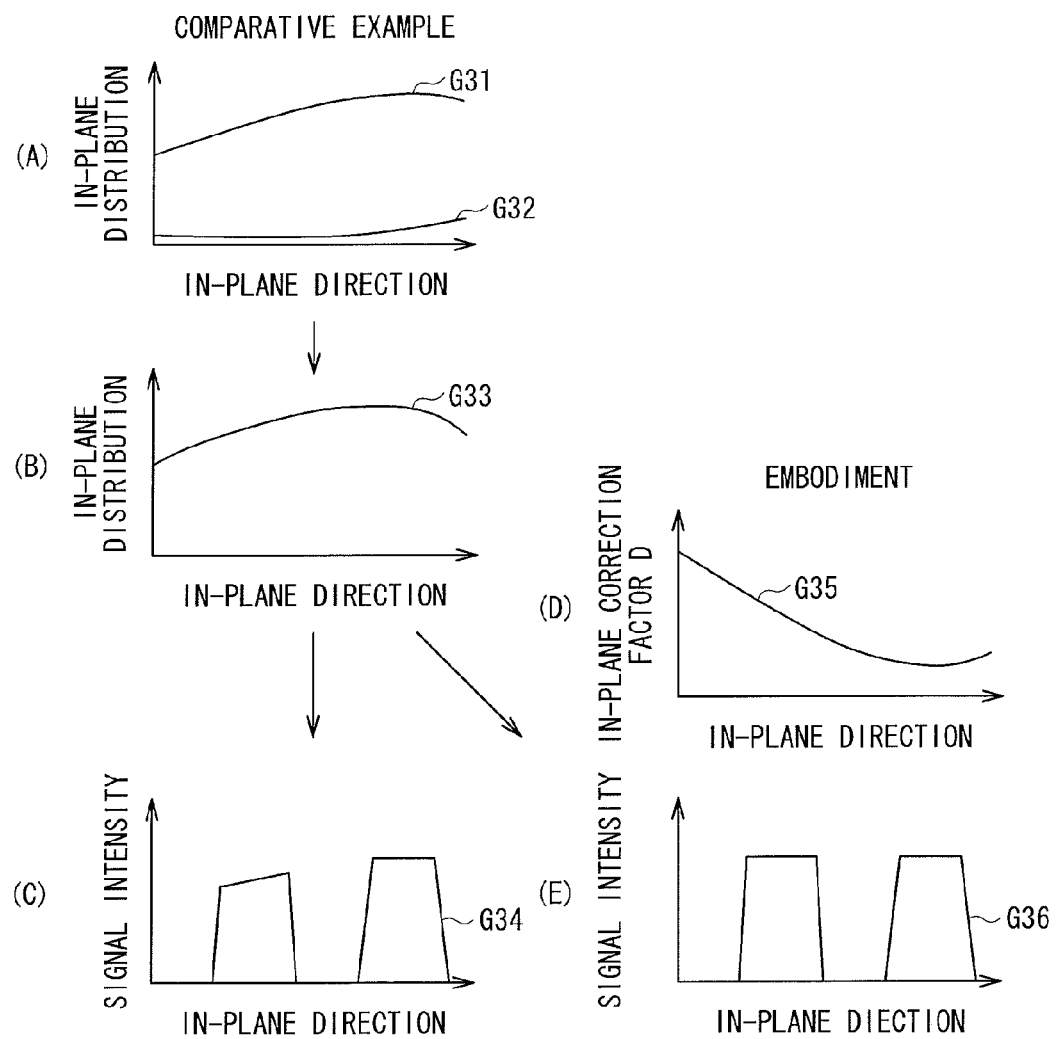
FIGS. 11A to 11E are diagrams for illustrating an example of in-plane correction processing shown in FIG. 10 together with a comparative example.

FIGS. 11A to 11E are diagrams showing an example of each of the photo-detection signal (AD value), the in-plane correction table 132, and the in-plane-corrected signal. FIG. 11A shows an example of an in-plane uneven state, where a vertical axis shows a level of unevenness, and a horizontal axis shows an in-plane direction. FIG. 11B shows an example of composite distribution (curve G33) of in-display-surface intensity distribution (curve G31) of light emitted from a display surface and in-plane photo-detection sensitivity distribution (curve G32) of a plurality of photodetectors 11b, where a vertical axis shows a level of unevenness, and a horizontal axis shows an in-plane direction. FIG. 11C shows an example (comparative example) of a photo-detection signal (AD value) in the presence of composite distribution shown by the curve G33, where a vertical axis shows a level of unevenness, and a horizontal axis shows an in-plane direction. FIG. 11D shows an example of the in-plane correction table 132 for compensating the composite distribution shown by the curve G33, where a vertical axis shows an in-plane correction factor D, and a horizontal axis shows an in-plane direction. FIG. 11E shows an example of an in-plane-corrected signal obtained by multiplying the photo-detection signal (AD value) by an in-plane correction table 132 (in-plane correction factor D) shown by a curve G35, where a vertical axis shows signal intensity, and a horizontal axis shows an in-plane direction.

First, an in-plane uneven state of luminance of the backlight 30 is, for example, as shown by the curve G31 of FIG. 11A. In addition, an in-plane uneven state of photo-detection sensitivity of the photodetectors 11b arranged in a matrix is, for example, as shown by the curve G32 of FIG. 11A. Composite distribution of such curves G31 and G32 is, for example, as shown in the curve G33 of FIG. 11B. Thus, the photo-detection signal (AD value) G34 output from the photo-detecting sensor 314 as the photodetector 11b is different in signal intensity in a plane due to the in-plane uneven state as shown by the curve G33 (curves G31 and G32), for example, as shown by FIG. 11C.

Thus, the in-plane correction section 131 operates (multiplies) the input photo-detection signal (AD value) and the in-plane correction table 132 (in-plane correction factor D) shown in FIG. 11D. Thus, the in-plane uneven state of signal intensity as shown by the photo-detection signal G34 in FIG. 11C is corrected into an in-plane even state as shown by a photo-detection signal G36 in FIG. 11E. In this way, the in-plane correction section 131 outputs the photo-detection signal G36 subjected to in-plane correction processing as an in-plane-corrected signal.

Outermost-Region Correction Processing: S203

Next, the correction section 133 in the photo-detection signal processor 13 performs outermost-region correction processing using the correction table 134 to the in-plane-corrected signal generated in this way, and thus generates a corrected signal (step S203). Specifically, for example, as shown in FIG. 9, the section 133 performs outermost-region correction processing to an in-plane-corrected signal corresponding to a photo-detection signal in the outermost-region (correction lines 110A1, 110A2, 110C1 and 110C2) of the effective photo-detectable region 110 of the input/output panel 11.

More specifically, the correction section 133 performs outermost-region correction processing using, for example, the following equations (11) to (14). In other words, the section 133 performs outermost-region correction processing (generates a corrected signal) through multiplying the in-plane-corrected signal by the correction factor. The section 133 independently performs outermost-region correction processing in a photodetector line along the x-axis (horizontal) or y-axis (vertical) direction of the input/output panel 11 in the outermost-region (upper-outermost region, lower-outermost region, left-outermost region, and right-outermost region) of the effective photo-detectable region 110. While outermost-region correction processing for the upper-outermost region and the left-outermost region of the effective display region 110 is described here, outermost-region correction processing for another outermost-region in the effective display region 110 is the same as the following processing while such processing is not shown.

In the equations, it is assumed for convenience that photo-detection signals $S_{11}$, $S_{12}$, ... denote the photo-detection signals that have been obtained by the photodetectors 11b (pixels 16) and then subjected to in-plane correction (the in-plane-corrected signals), respectively. Photo-detection signals $S_{11}'$, $S_{12}'$, ... denote in-plane-corrected signals subjected to outermost-region correction processing (the corrected signals), and photo-detection signals $S_{11}''$, $S_{12}''$, ... denote in-plane-corrected signals subjected to outermost-region correction processing twice (the corrected signals). In other words, outermost-region correction processing is performed twice along each of the x-axis (horizontal) and y-axis (vertical) directions in an upper-left outermost-region of the effective display region 110 denoted by a symbol P2 in FIG. 9, according to the following equations (13) and (14).

$$(S_{11}',S_{12}',S_{13}',S_{14}',\ldots)=(S_{11},S_{12},S_{13},S_{14},\ldots)*X_1(=(M/A_1)) \qquad (11)$$

$$(S_{21}',S_{22}',S_{23}',S_{24}',\ldots)=(S_{21},S_{22},S_{23},S_{24},\ldots)*X_2(=(M/A_2)) \qquad (12)$$

$$(S_{11}'',S_{21}'',S_{31}',S_{41}',\ldots)=(S_{11}',S_{21}',S_{31},S_{41},\ldots)*Y_1(=(M/C_1)) \qquad (13)$$

$$(S_{12}'',S_{22}'',S_{32}',S_{42}',\ldots)=(S_{12}',S_{22}',S_{32}',S_{42},\ldots)*Y_2(=(M/C_2)) \qquad (14)$$

Figures 12A, 12B:
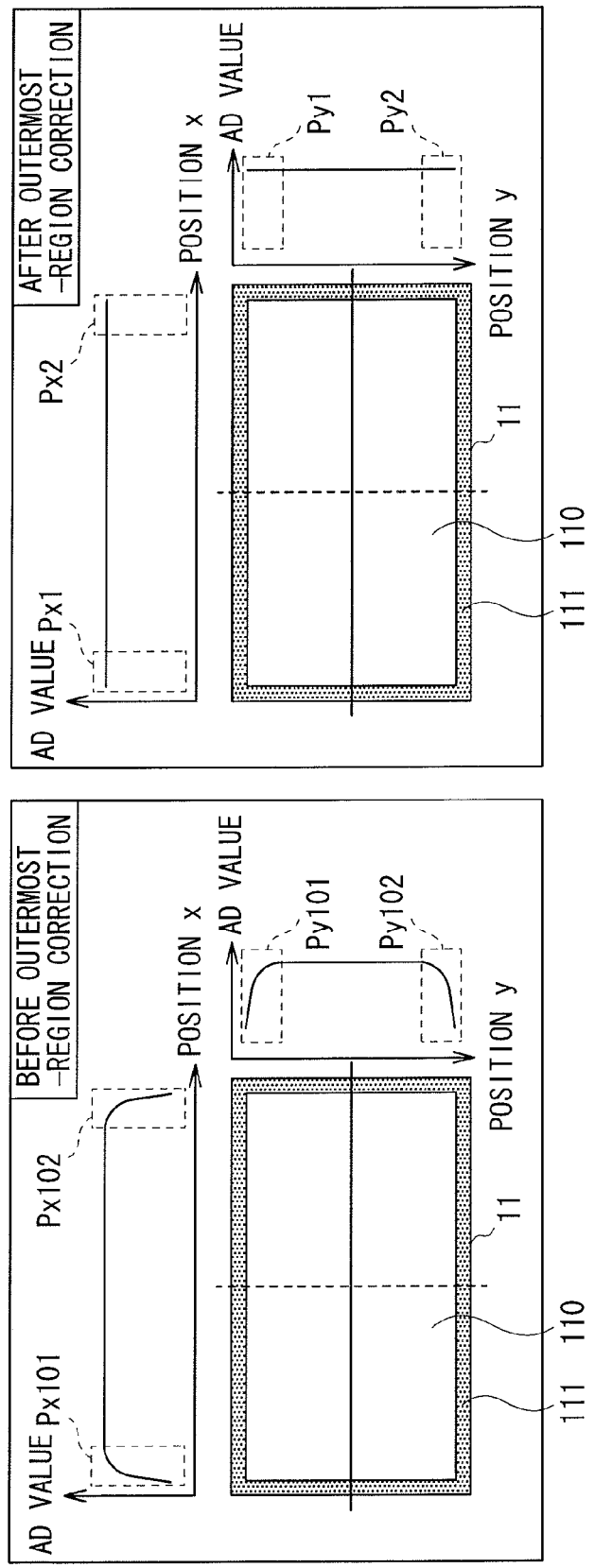
FIGS. 12A and 12B are schematic diagrams showing an example of a relationship between a signal value of a photo-detection signal and a position thereof before and after outermost-region correction according to the embodiment.

Thus, the input/output panel 11 in the embodiment provides the following operation and effects. First, since the input/output panel 11 has the BM layer 316 as a shading layer in the frame region 111 as shown in FIG. 3, the frame region 111 acts as a shading region. From this, light is not incident from a frame region 111 side in a margin of the effective display region 110 to photodetectors 11b (photo-detecting sensors 314) in the outermost-region of the region 110. Therefore, signal intensity of a photo-detection signal is lowered in the outermost-region of the effective display region 110 compared with a photo-detection signal obtained from each of photodetectors 11b in an inner region of the region 110 (for example, photo-detecting sensors 314 except for one denoted by the symbol P1 in FIG. 3) (see symbols Px101, Px102, Py101 and Py102 in FIG. 12A). This means reduction in in-plane evenness of photo-detection signal intensity in the effective display region 110. Such a difficulty occurs particularly conspicuously in the case that a distance between a photo-detection surface and a touch surface of the external proximity object 6 (for example, a distance d in FIG. 3) is increased, for example, in the case that a protective glass plate (protective glass 317) or the like is attached on the display surface as shown in FIG. 3.

Therefore, when an external proximity object 6 is detected based on a photo-detection signal obtained in this way, the object 6 may not be accurately detected, leading to a possibility of a position detection error or the like. In other words, if the outermost-region correction processing in the embodiment is not performed, the external proximity object 6 is hard to be detected with high accuracy.

In contrast, in the embodiment, the correction section 133 performs the outermost-region correction processing using the correction table 134 to the in-plane-corrected signal, and thus generates the corrected signal. Specifically, the section 133 performs the outermost-region correction processing to an in-plane-corrected signal corresponding to a photo-detection signal (outermost-region photo-detection signal) obtained from a photodetector 11b (photo-detecting sensor 314) in the outermost-region of the effective photo-detectable region 110 of the input/output panel 11.

Thus, for example, correction processing is performed to an in-plane-corrected signal corresponding to a photo-detection signal in the outermost-region (correction lines 110A1, 110A2, 110C1 and 110C2) of the effective photo-detectable region 110 to increase signal intensity of the in-plane-corrected signal. In other words, preferably, signal intensity of the outermost-region photo-detection signal becomes approximately the same as (here, equal to) signal intensity of a photo-detection signal (inner photo-detection signal) obtained from a photodetector in the inner region of the effective photo-detectable region 110, for example, as denoted by symbols Px1, Px2, Py1 and Py2 in FIG. 12B. Therefore, as described above, even if signal intensity of a photo-detection signal is reduced in the outermost-region of the effective display region 110 compared with a photo-detection signal obtained in the inner region of the region 110, such reduction in signal intensity may be reduced or avoided.

Noise Removal to Object Information Acquisition: S204 to S208

Next, the photo-detection signal processor 13 uses predetermined noise data to remove noise from the processed image obtained based on a photo-detection signal (corrected signal) subjected to such an outermost-region correction processing (step S204).

Then, the image processor 14 is input with a pickup image (processed image) subjected to the in-plane correction processing and the outermost-region correction processing, and performs binarization processing to the processed image (step S205). Specifically, the image processor 14 stores a predeterminately set threshold value, and, for example, performs such binarization processing that signal intensity of processed image data is compared to the threshold value, and set to "0" or "1" depending on whether the signal intensity is smaller or not than the threshold value. Thus, a portion that receives light reflected by the external proximity object 6 is set to "1", and other portions are set to "0".

Next, the image processor 14 removes isolated points from the binarized processed image (step S206). In other words, when the processed image is binarized as above, the image processor 14 removes noise through removing a portion set to "1" isolated from the external proximity object 6.

Then, the image processor 14 performs labeling processing (step S207). In other words, when the processed image is binarized as above, the image processor 14 performs labeling processing to a portion set to "1".

Figure 13:
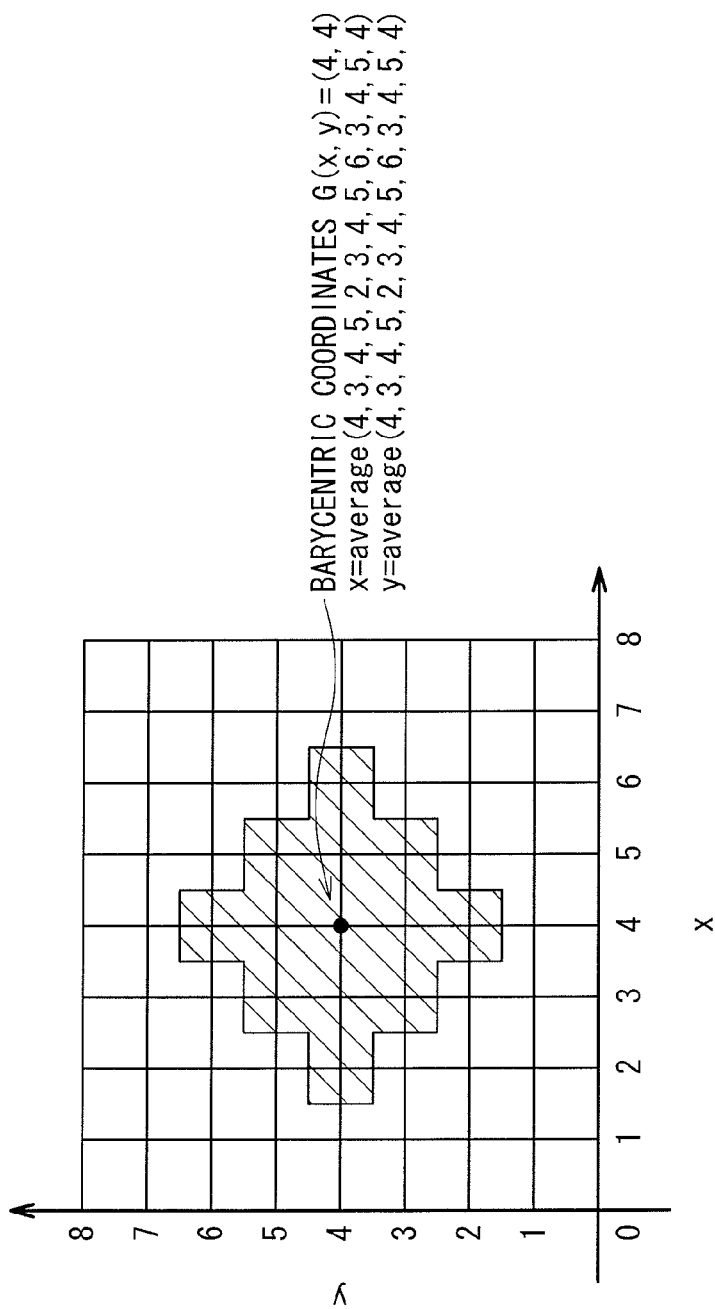
FIG. 13 is a conceptual diagram for illustrating calculation of barycentric coordinates in acquiring object information.

Then, the image processor 14 detects a region set to "1" as a region of the external proximity object 6, and obtains barycentric or central coordinates of the region to acquire object information (step S208). Specifically, for an image signal subjected to labeling processing, barycentric coordinates G of the external proximity object 6 are calculated through calculation of the average of each of x and y values of the central coordinates, for example, as shown in FIG. 13. For example, when an x coordinate group includes (4, 3, 4, 5, 2, 3, 4, 5, 6, 3, 4, 5, 4), and a y coordinate group includes (4, 3, 4, 5, 2, 3, 4, 5, 6, 3, 4, 5, 4), central coordinates of the coordinates are given as (x, y)=(4, 4), which correspond to the barycentric coordinates G. In this way, a position of the object is determined. This is the end of acquisition processing of object information as shown in FIG. 10, and obtained data including the position of the external proximity object 6 are output to the controller 21 as object information.

Thereafter, the controller 21 uses the object information input from the image processor 14 to perform necessary processing such as change of a display image. Specifically, when a case that some operation menu is displayed on a screen is assumed, the processor 14 detects a button in the menu selected by a user's finger, and executes a command corresponding to the selected button.

As hereinbefore, in the embodiment, outermost-region correction processing is performed to the outermost-region photo-detection signal obtained from a photodetector 11b (photo-detecting sensor 314) in the outermost-region of the effective photo-detectable region 110 of the input/output panel 11 so that intensity of the signal is increased, and object information of an external proximity object is acquired based on a photo-detection signal (corrected signal) subjected to the outermost-region correction processing. This may suppress reduction in signal intensity of a photo-detection signal in the outermost-region compared with in the inner region due to presence of the frame region 111 (shading region), leading to improvement in in-plane evenness of photo-detection signal intensity in the effective display region 110. Accordingly, object information of an external proximity object is acquired based on a photo-detection signal (corrected signal) subjected to such outermost-region correction processing, and therefore the object may be detected with high accuracy.

In addition, the in-plane correction table 134 for compensating in-plane luminance distribution of the backlight 30 and difference in photo-detection sensitivity between the photodetectors 11b is used for in-plane correction of a photo-detection signal from a photodetector 11b that receives reflected light, the light having been emitted from the backlight 30 and then reflected by the external proximity object 6. Thus, more accurate image processing may be performed based on the corrected photo-detection signal (in-plane-corrected signal), as a result, the external proximity object 6 may be more accurately detected.

Furthermore, by creating and recording the in-plane correction table 132 or the correction table 134 in a memory before the information input/output device 1 is shipped to a user, the user may save effort for creating the correction table. However, when a user may also create the correction table, even if the input/output panel 11 is changed with time, the user may appropriately create the correction table in accordance with such change with time. Accordingly, even if considerably long operating time has passed, an appropriately corrected, accurate pickup image may be obtained at any time.

In the embodiment, when the in-plane correction table 132 is created, the photo-detection average B and the maximum photo-detection average Bmax of each block 15 are obtained, and the in-plane correction factor D is obtained through calculation using the values. However, the in-plane correction factor D is not limited to the value obtained through such calculation. For example, the in-plane correction factor D may be obtained by using an optional constant in place of the maximum photo-detection average Bmax. The optional constant can be, for example, a value 1, and in this case, the in-plane correction factor D is simply the reciprocal of the photo-detection average B. Alternatively, a value expected to be similar to the maximum photo-detection average Bmax may be used as the constant in place of the maximum photo-detection average Bmax. In this case, a value as a result of dividing the constant by each photo-detection average B corresponds to a value of the in-plane correction factor D. Moreover, the in-plane correction table 132 may have any values as long as the table 132 may compensate (cancel) an in-plane uneven state as illustrated by the curves G31 and G32 in FIG. 11A, namely, as long as the table 132 has distribution (inverted distribution) opposite to the curve G33.

In addition, it is acceptable that the number of in-plane correction factors D is made small (coarsely set) in the in-plane correction table 132, and when no in-plane correction factor D corresponding to a block 15 exists in the in-plane correction table 132, data interpolation is performed based on existent in-plane correction factors D of blocks 15. In other words, it is acceptable that an in-plane correction factor D is obtained through data interpolation for a block 15 of photo-detectors 11b having no corresponding in-plane correction factor D, and the obtained in-plane correction factor D through the interpolation is used for in-plane correction. For example, an in-plane correction factor D of a block 15 may be interpolated by using in-plane correction factors D of blocks 15 adjacent to the relevant block. This prevents abrupt change in in-plane correction factor D between adjacent blocks 15, so that the in-plane correction table 132 may be gradually changed. Moreover, this may reduce memory capacity for storing the in-plane correction table 132.

In addition, in the embodiment, a block 15 is configured of a plurality of adjacent photodetectors 11b among photodetectors 11b arranged in a matrix, and an in-plane correction factor D is obtained for each block 15 so that the in-plane correction table 132 is achieved. However, it is acceptable that an in-plane correction factor D is obtained for each of the photodetectors 11b arranged for respective pixels, and a plurality of in-plane correction factors D are collected to achieve the in-plane correction table 132. In this case, since in-plane correction factors D may be finely obtained in a plane compared with the case where an in-plane correction factor D is obtained for each block 15, a more accurately in-plane-corrected image may be obtained.

2. MODIFICATIONS

Next, modifications (modifications 1 to 4) of the embodiment are described. The same components as in the embodiment are marked with the same reference numerals or symbols, and description of the components is appropriately omitted.

Modification 1

Figure 14:
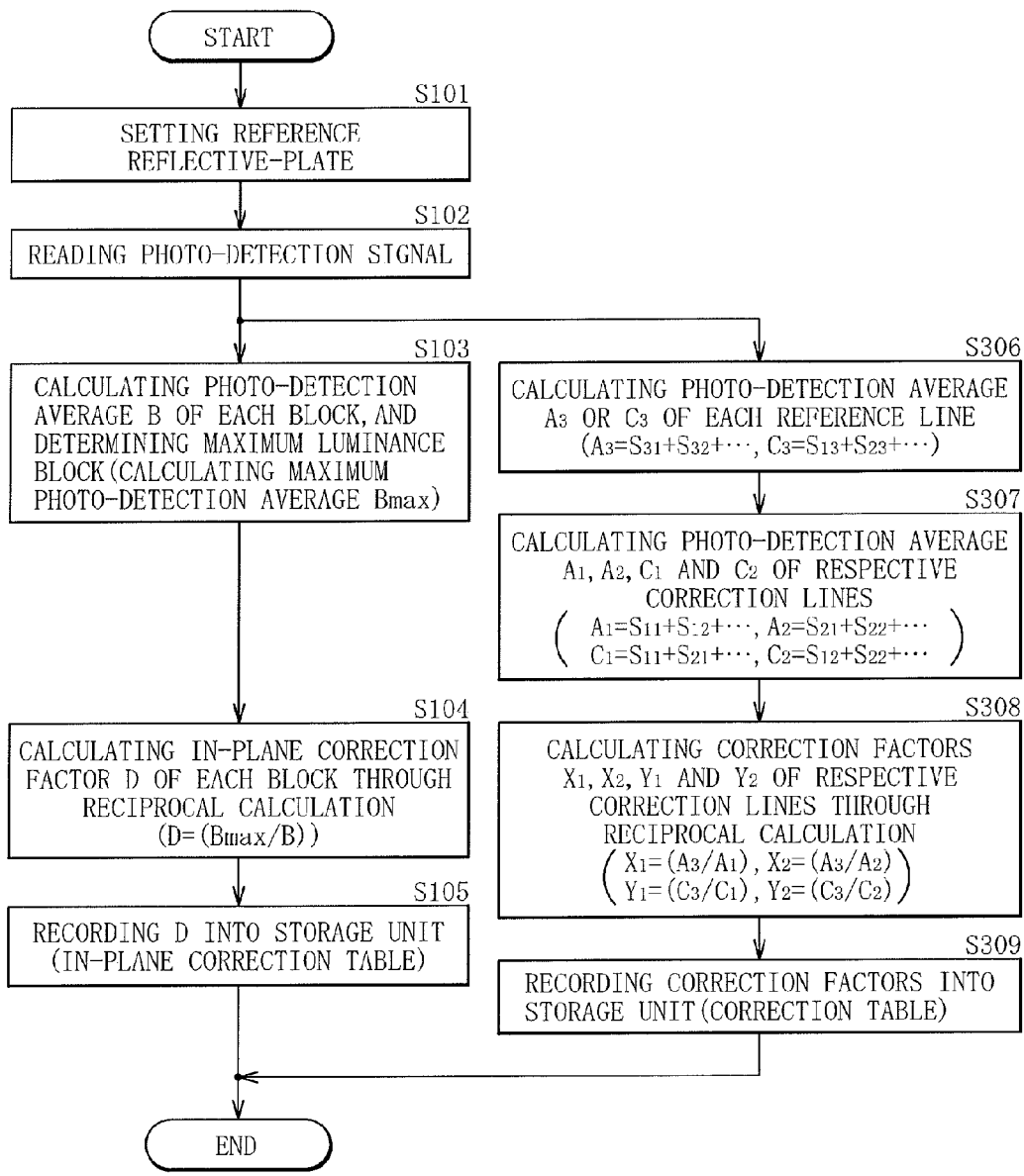
FIG. 14 is a flowchart showing a method of creating an in-plane correction table and an correction table according to modification 1.

FIG. 14 is a flowchart showing a method of creating each of an in-plane correction table 132 and an correction table 134 according to modification 1. In the modification, steps of creating/recording the correction table 134 (steps S306 to S309) are different from those in the embodiment. In other words, steps of acquiring a photo-detection signal (steps S101 and S102) and steps of creating/recording the in-plane correction table 132 (steps S103 to S105) are the same as in the embodiment, and therefore description of the steps is omitted.

Figure 15:
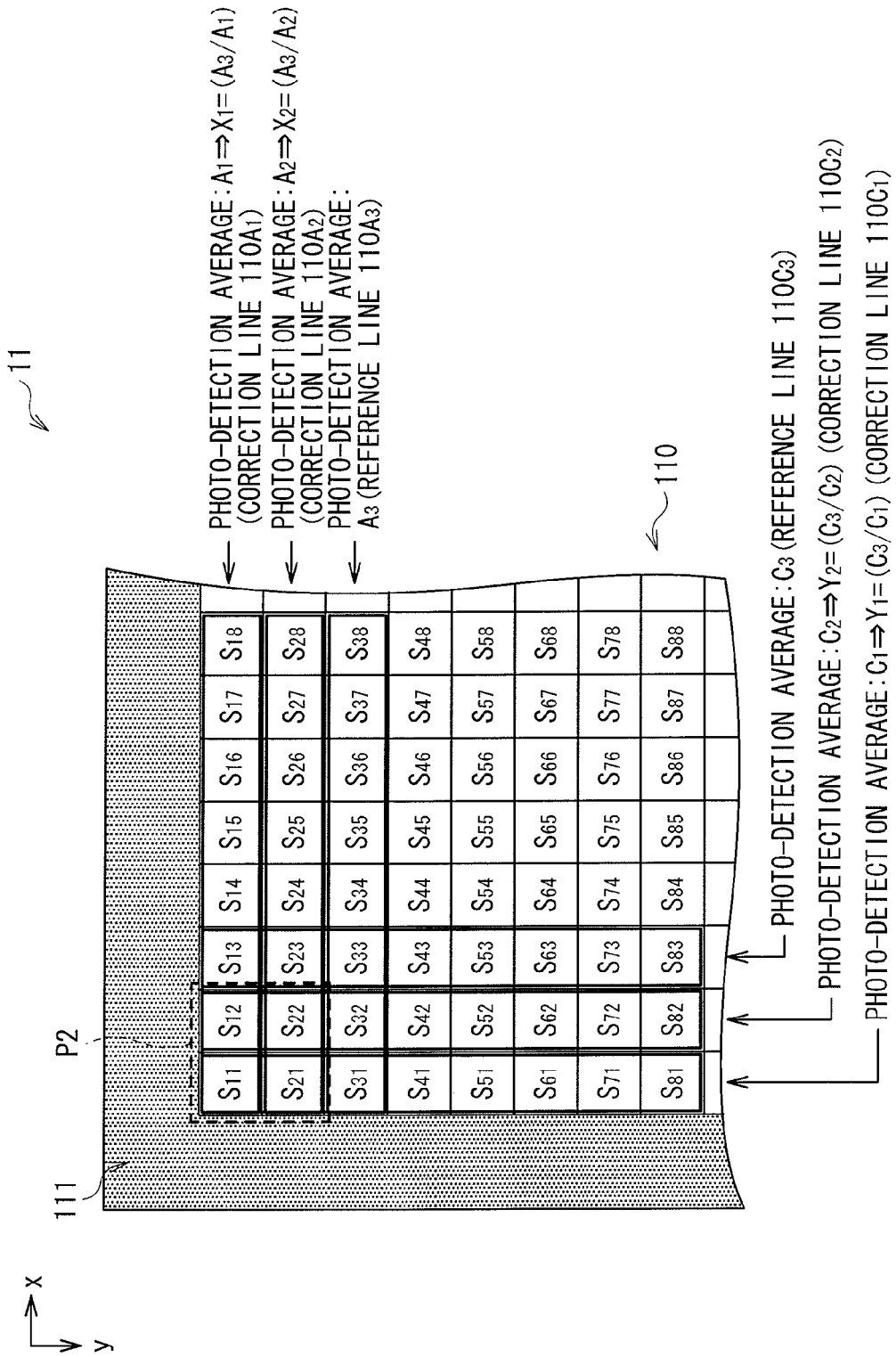
FIG. 15 is a schematic plan diagram for illustrating a summary of outermost-region correction according to the modification 1.

In the modification, one photodetector line along an x-axis (horizontal) direction or y-axis (vertical) direction of the input/output panel 11 is provided as a reference region in an inner region of the effective display region 110, for example, as shown in FIG. 15. In the above embodiment, the reference area 110M as the whole of the inner region of the effective display region 110 has been set as the reference region for obtaining the correction factor. In contrast, in the modification, one or multiple photodetector line (line-shaped region) along the x-axis direction or y-axis direction as a part of a region adjacent to the outermost-region is set as such a reference region in the inner region of the effective display region 110. Specifically, a reference line 110A3 as an inner region adjacent to a correction line 110A2 corresponding to an upper-outermost-region of the outermost-region is set to a line-shaped region as a reference region along the x-axis direction. In addition, a reference line 110C3 as an inner region adjacent to a correction line 110C2 corresponding to a left-outermost-region of the outermost-region is set to a line-shaped region as a reference region along the y-axis direction. While not shown, reference lines are set in the same way for lower-outermost-region and right-outermost-regions of the outermost-region respectively.

Therefore, in the modification, when the correction table 134 is created/recorded, first, photo-detection averages A3 and C3 as intensity average of photo-detection signals output from photodetectors 11b (pixels 16) in the reference lines 110A3 and 110C3 are obtained respectively. Specifically, the photo-detection average are obtained through calculation using the following equations (15) and (16) (step S306 of FIG. 14).

$$A_3 = (S_{31} + S_{32} + S_{33} + S_{34} + \ldots) \tag{15}$$

$$C_3 = (S_{13} + S_{23} + S_{33} + S_{43} + \ldots) \tag{16}$$

Next, in the same way as step S107 in the embodiment, photo-detection averages $A_1$, $A_2$, $C_1$ and $C_2$ in the respective correction lines 110A1, 110A2, 110C1 and 110C2 are obtained through calculation using the equations (3) to (6), respectively (step S307).

Next, reciprocal calculation is performed to obtain a reciprocal of a normalized value obtained by dividing each of the photo-detection averages $A_1$, $A_2$, $C_1$ and $C_2$ obtained in this way by each of the photo-detection averages $A_3$ and $C_3$ in the reference lines 110A3 and 110C3, respectively. Then, values obtained as a result of the reciprocal calculation are assumed to be correction factors $X_1$, $X_2$, $Y_1$ and $Y_2$ for the correction lines 110A1, 110A2, 110C1 and 110C2, respectively. In other words, the correction factors $X_1$, $X_2$, $Y_1$ and $Y_2$ as correction factors for outermost-region correction processing are obtained through reciprocal calculation shown by the following equations (17) to (20) (step S308). In this way, in the modification, each of the correction factors $X_1$, $X_2$, $Y_1$ and $Y_2$ is defined by a ratio of each of the photo-detection averages $A_3$ and $C_3$ in the reference lines 110A3 and 110C3 to each of the photo-detection averages $A_1$, $A_2$, $C_1$ and $C_2$ in the correction lines 110A1, 110A2, 110C1 and 110C2.

$$X_1 = (A_3/A_1) \tag{17}$$

$$X_2 = (A_3/A_2) \tag{18}$$

$$Y_1 = (C_3/C_1) \tag{19}$$

$$Y_2 = (C_3/C_2) \tag{20}$$

The obtained correction factors $X_1$, $X_2$, $Y_1$ and $Y_2$ are recorded in the memory as in the step S109 of the embodiment. This is the end of creation of the correction table 134 according to the modification (step S309).

In the modification, the correction section 133 performs outermost-region correction processing using the correction table 134 created in this way by using, for example, the following equations (21) to (24) as in the embodiment. Thus, the same operation and thus the same effects as in the embodiment may be obtained.

$$(S_{11}', S_{12}', S_{13}', S_{14}', \ldots) = (S_{11}, S_{12}, S_{13}, S_{14}, \ldots) * X_1 (= (A_3/A_1)) \tag{21}$$

$$(S_{21}', S_{22}', S_{23}', S_{24}', \ldots) = (S_{21}, S_{22}, S_{23}, S_{24}, \ldots) * X_2 (= (A_3/A_2)) \tag{22}$$

$$(S_{11}'', S_{21}'', S_{31}'', S_{41}'', \ldots) = (S_{11}', S_{21}', S_{31}', S_{41}', \ldots) * Y_1 (= (C_3/C_1)) \tag{23}$$

$$(S_{12}'', S_{22}'', S_{32}'', S_{42}'', \ldots) = (S_{12}', S_{22}', S_{32}', S_{42}', \ldots) * Y_2 (= (C_3/C_2)) \tag{24}$$

Moreover, in the modification, since the reference lines 110A3 and 110C3 and the respective correction lines are in a close positional relationship compared with a combination of the reference area 110M and the respective correction lines, local continuity is provided, and therefore appropriate outermost-region correction processing may be performed compared with in the embodiment.

Modification 2

Figure 16:
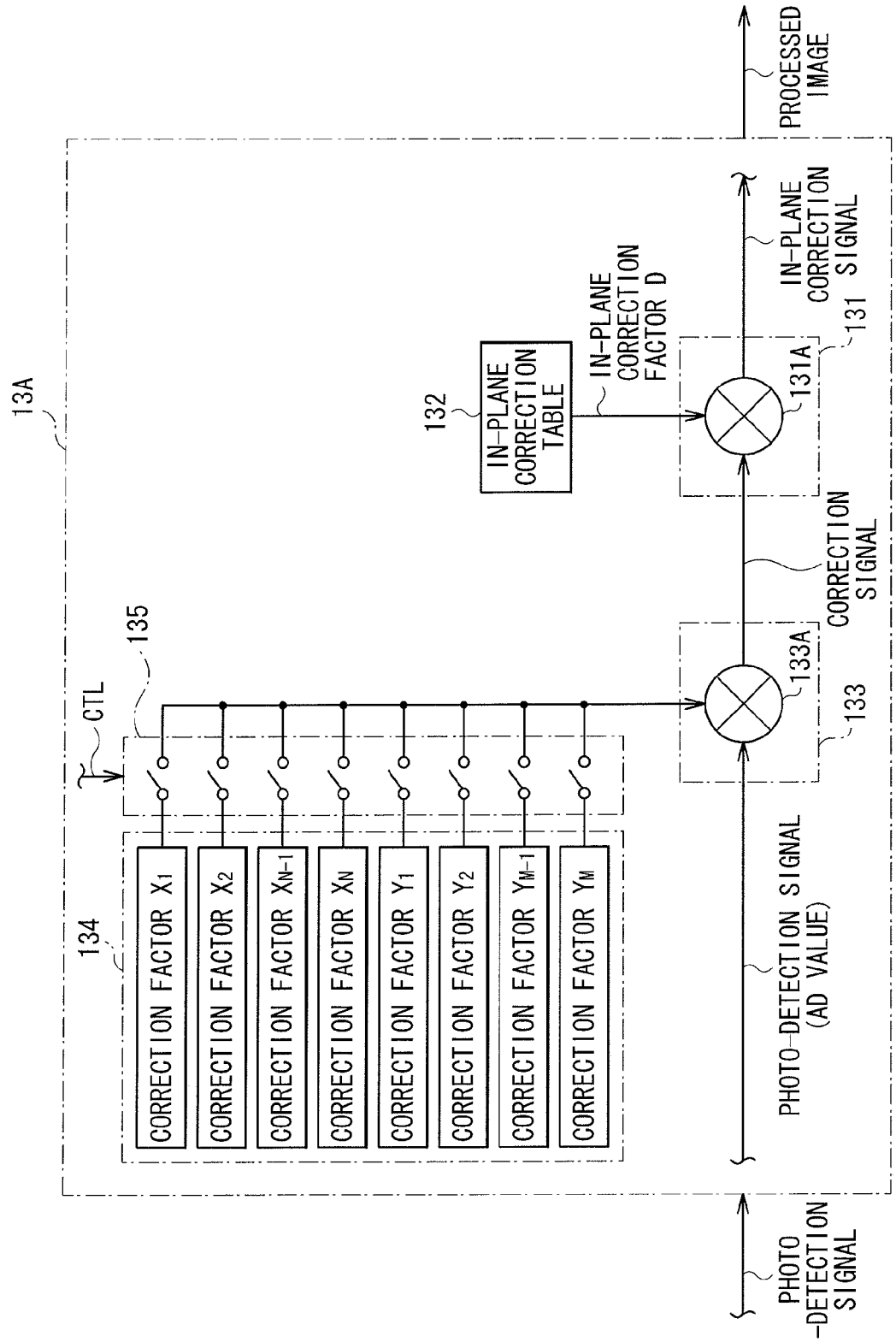
FIG. 16 is a block diagram showing a detailed configuration of a photo-detection signal processor according to modification 2.

FIG. 16 is a block diagram showing a detailed configuration of a photo-detection signal processor 13A according to modification 2. The photo-detection signal processor 13A of the modification corresponds to the photo-detection signal processor 13 in the embodiment in which in-plane correction processing and outermost-region correction processing are performed in reverse order.

In other words, in the photo-detection signal processor 13A, first, the correction section 133 performs outermost-region correction processing using the correction table 134 to a photo-detection signal (AD value) from a photo-detecting sensor 314 to generate a corrected signal. Next, the in-plane correction section 131 performs in-plane correction processing using the in-plane correction table 132 to the corrected signal to generate an in-plane-corrected signal. Then, a processed image is formed based on the in-plane-corrected signal.

According to such a configuration, even in the modification, the same operation and thus the same effects as in the embodiment may be obtained.

Modification 3

Figure 17:
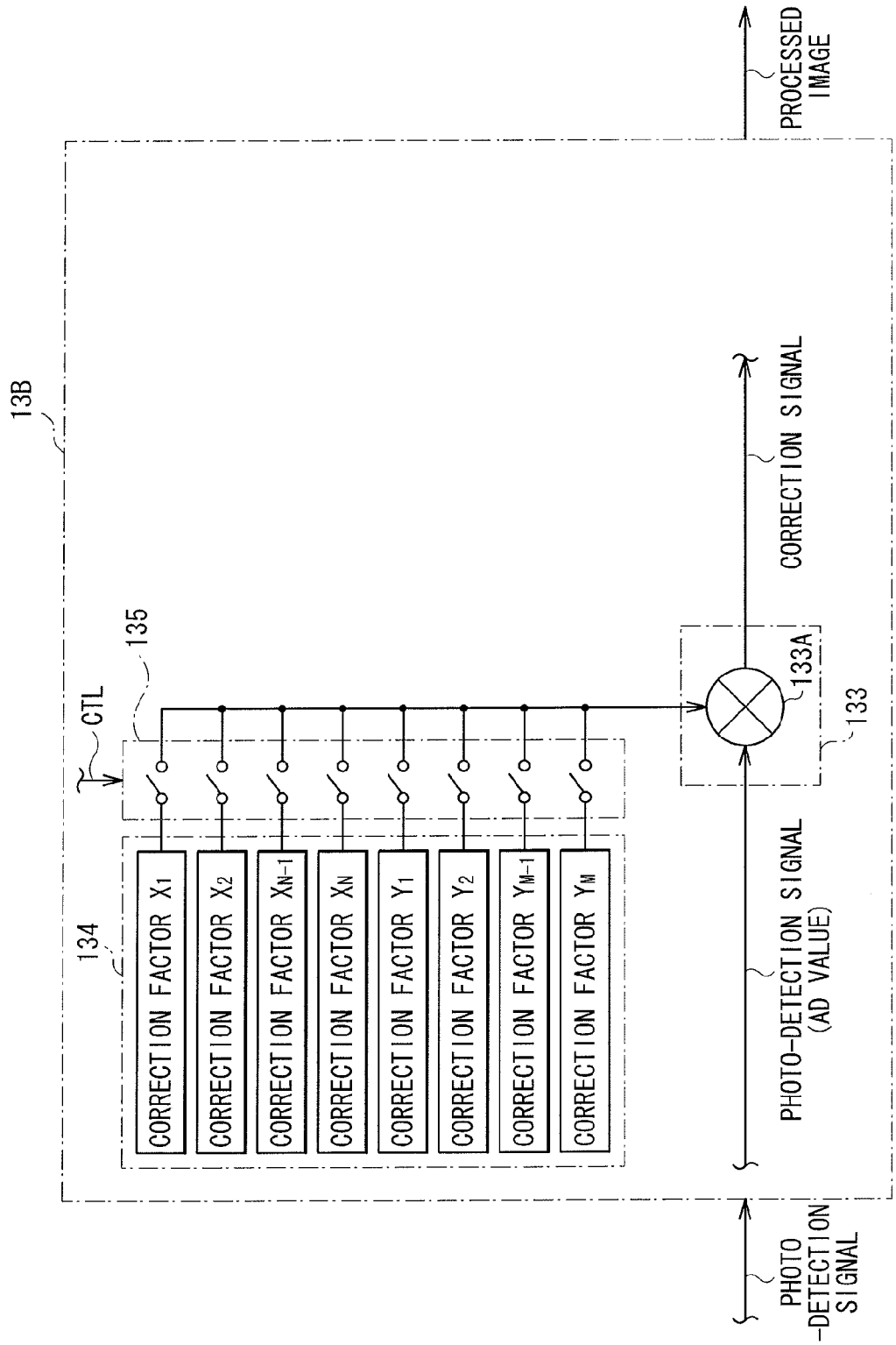
FIG. 17 is a block diagram showing a detailed configuration of a photo-detection signal processor according to modification 3.

FIG. 17 is a block diagram showing a detailed configuration of a photo-detection signal processor 13B according to modification 3. The photo-detection signal processor 13B of the modification corresponds to the photo-detection signal processor 13 of the embodiment in which the in-plane correction section 131 and the in-plane correction table 132 are not provided.

In other words, in the photo-detection signal processor 13B, first, the correction section 133 performs outermost-region correction processing using the correction table 134 to a photo-detection signal (AD value) from a photo-detecting sensor 314 to generate a corrected signal. Then, a processed image is formed based on the corrected signal.

While both of the in-plane correction processing and the outermost-region correction processing are performed in the embodiment and the like, only the outermost-region correction processing may be performed without performing the in-plane correction processing as in the modification.

Modification 4

Figure 18:
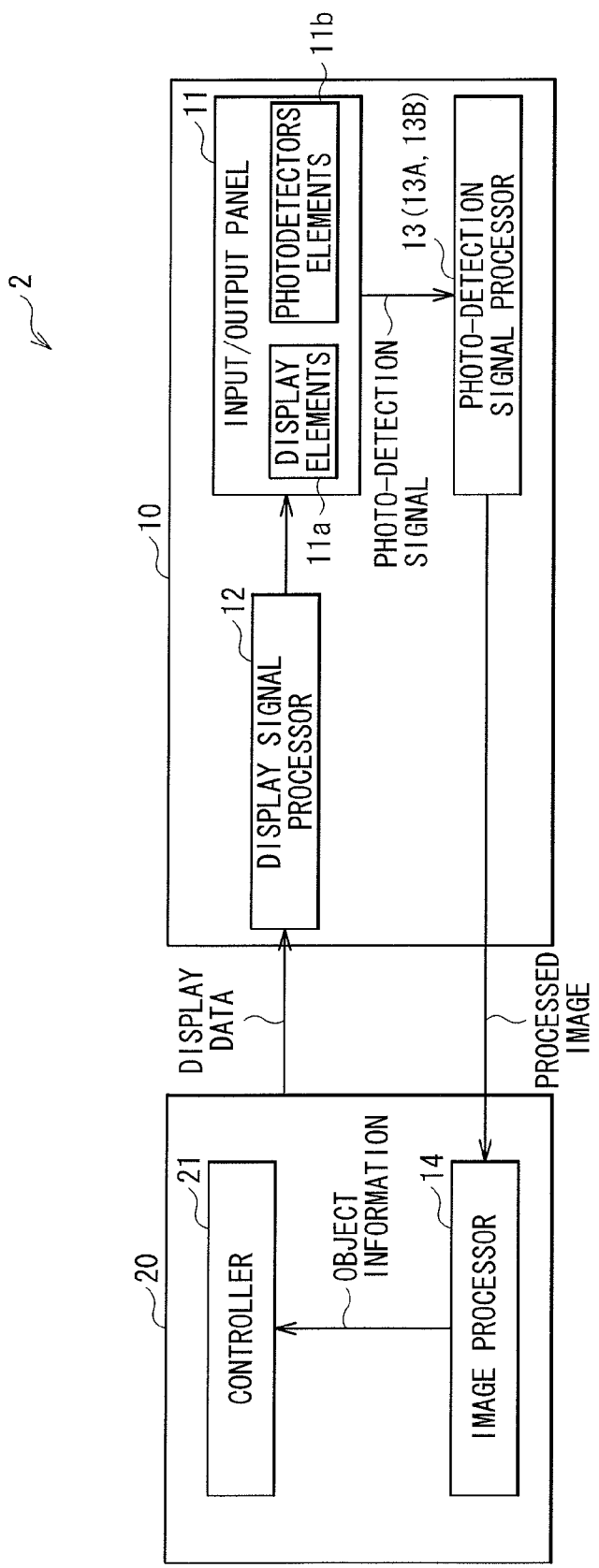
FIG. 18 is a block diagram showing a configuration of an information input/output device according to modification 4.

FIG. 18 is a block diagram showing an information input/output device 2 according to modification 4. The information input/output device 2 of the modification is different from the information input/output device 1 of the embodiment in that the image processor 14 is provided in the electronic instrument body 20. Specifically, in the information input/output device 2, the display signal processor 12, the input/output panel 11 and the photo-detection signal processor 13 (or photo-detection signal processor 13A or 13B) are provided in the display 10, and the controller 21 and the image processor 14 are provided in the electronic instrument body 20. Even in such an information input/output device 2, the same effects as in the information input/output device 1 of the embodiment may be obtained.

3. APPLICATION EXAMPLES

Next, application examples of the information input/output devices described in the embodiment and modifications are described with reference to FIGS. 19 to 23. The information input/output device according to the embodiment and the like may be applied to electronic instruments in any field such as a television apparatus, a digital camera, a notebook personal computer, a mobile terminal such as mobile phone, or a video camera. In other words, the information input/output devices according to the embodiment and the like may be applied to electronic instruments in any field, each of which displays an image or a video picture based on an externally-input or internally-generated image signal.

Application Example 1

Figure 19:
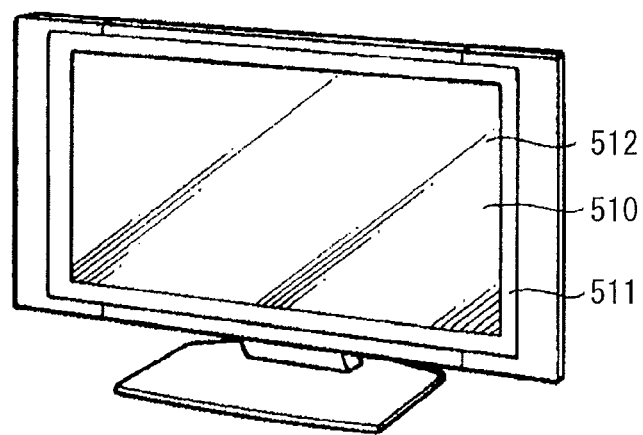
FIG. 19 is a perspective diagram showing appearance of application example 1 of the information input/output device according to an embodiment of the application.

FIG. 19 is a perspective diagram showing appearance of a television apparatus using the information input/output device according to the embodiment or the like. The television apparatus has, for example, an image display screen 510 including a front panel 511 and filter glass 512, and the image display screen 510 is configured of the information input/output device according to the embodiment or the like.

Application Example 2

Figure 20A:
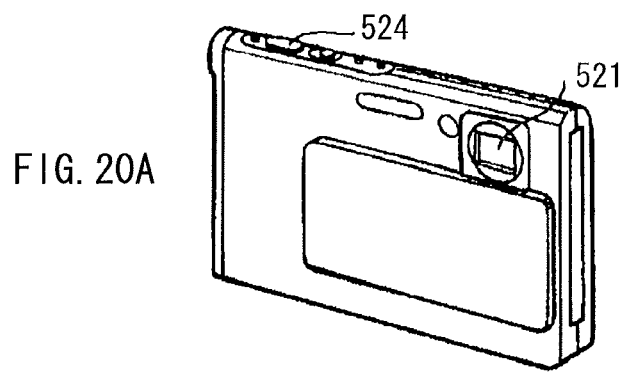
FIGS. 20A and 20B are perspective diagrams, where
Figure 20B:
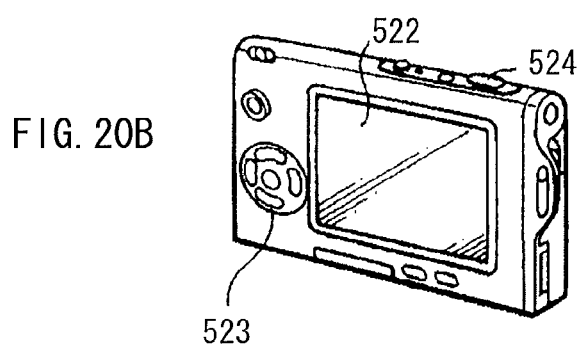

FIGS. 20A and 20B are perspective diagrams showing appearance of a digital camera using the information input/output device according to the embodiment or the like. The digital camera has, for example, a light emitting section for flash 521, a display 522, a menu switch 523 and a shutter button 524, and the display 522 is configured of the information input/output device according to the embodiment or the like.

Application Example 3

Figure 21:
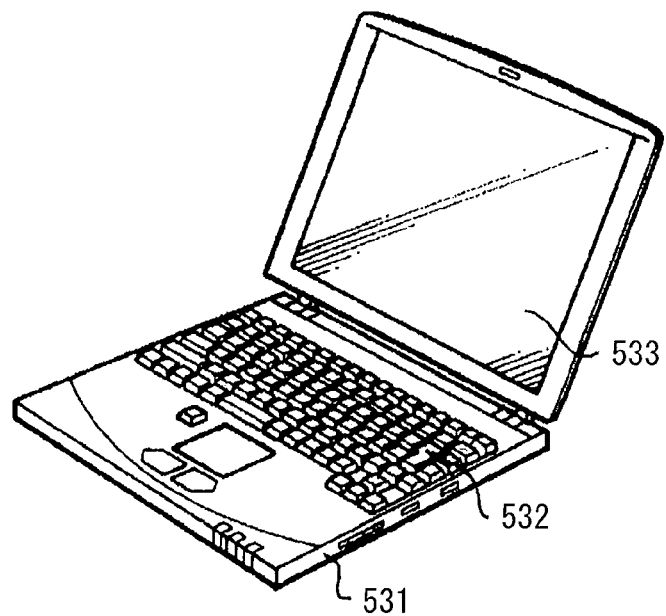
FIG. 21 is a perspective diagram showing appearance of application example 3.

FIG. 21 is a perspective diagram showing appearance of a notebook personal computer using the information input/output device according to the embodiment or the like. The notebook personal computer has, for example, a body 531, a keyboard 532 for input operation of letters and the like, and a display 533 for displaying images, and the display 533 is configured of the information input/output device according to the embodiment or the like.

Application Example 4

Figure 22:
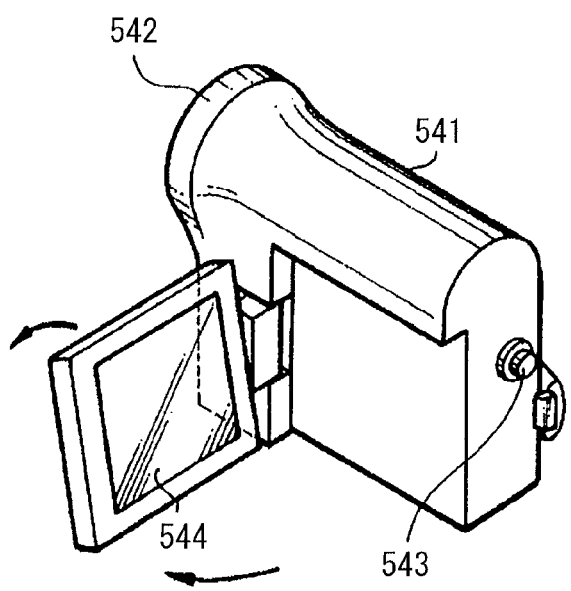
FIG. 22 is a perspective diagram showing appearance of application example 4.

FIG. 22 is a perspective diagram showing appearance of a video camera using the information input/output device according to the embodiment or the like. The video camera has, for example, a body 541, an object-shooting lens 542 provided on a front side-face of the body 541, and a start/stop switch 543 for shooting, and a display 544. The display 544 is configured of the information input/output device according to the embodiment or the like.

Application Example 5

FIGS. 23A to 23G are perspective diagrams showing appearance of a mobile phone using the information input/output device according to the embodiment or the like. For example, the mobile phone is assembled by connecting an upper housing 710 to a lower housing 720 by a hinge 730, and has a display 740, a sub display 750, a picture light 760, and a camera 770. The display 740 or the sub display 750 is configured of the information input/output device according to the embodiment or the like.

4. OTHER MODIFICATIONS

While the application has been described with the embodiment, modifications, and application examples hereinbefore, the application is not limited to the embodiment and the like, and may be variously modified or altered.

For example, a range of the reference area 110M (extent of the area), a position or the number of each reference line, and a position or the number of each correction line are not limited to those described in the embodiment and the like, and may be optionally set.

Moreover, in the embodiment and the like, the correction section 133 independently performs outermost-region correction processing in a photodetector line along a horizontal or vertical direction of the input/output panel 11 in the outermost-region (upper-outermost-region, lower-outermost-region, left-outermost-region, or right-outermost-region) of the effective display region 110. However, such outermost-region correction processing is not limitative. For example, outermost-region correction processing may be collectively performed in each of the upper-outermost region, lower-outermost region, left-outermost region, and right-outermost region.

Furthermore, while description has been made on a case where the correction section 133 performs outermost-region correction processing by using the correction table 134 in the embodiment and the like, a method of outermost-region correction processing is not limited to such a case, and other methods may be used for outermost-region correction processing.

In addition, while description has been made on a case where the controller 21 is provided in the electronic instrument body 20 in the embodiment and the like, the controller 21 may be provided in the display 10.

In addition, while one photo-detection cell CR is provided in correspondence to one display cell CW in the embodiment and the like, one photo-detection cell CR may be provided in correspondence to multiple display cells CW.

In addition, while description has been made on a case of an input/output panel including a liquid crystal panel having the backlight 30 in the embodiment and the like, a display backlight may be combined with a detection light source, or a special detection light source (irradiation light source) may be provided. When a detection light source is provided, light in a wavelength range other than a visible light range (for example, infrared light) is preferably used.

The information input/output device 1 or 2 has been described with a configuration where a liquid crystal display panel is used as an input/output panel. However, the information input/output device according to an embodiment of the application may be configured to use an organic EL (Electro Luminescence) panel or the like as the input/output panel. An organic EL element is a display element having a property of emitting light upon application of a forward bias voltage, and receiving light and thus generating electric current upon application of a reverse bias voltage. This means that the organic EL element has a display element 11a and a photodetector 11b. In this case, an input/output panel is configured by disposing organic EL elements for respective pixels, where some organic EL elements are applied with a forward bias voltage to emit light depending on display data so as to display an image, and other organic EL elements are applied with a reverse bias voltage to receive reflected light.

Furthermore, the application has been described with the information input/output device, as an example, having the input/output panel having a plurality of display elements 11a and a plurality of photodetectors 11b (having a detection function of detecting an external proximity object and an image display function) hereinbefore. However, the application may be applied to an information input device (image pickup device) having an input panel having a plurality of photodetectors 11b (having a detection function of detecting an external proximity object). For example, such an input panel has a light source (irradiation light source) that emits detection light for detecting an external proximity object. In other words, such an input panel and an output panel (display panel) for image display based on display data generated by the controller 21 may be separately provided.

In addition, while description has been made on a case where the input/output panel or input panel detects reflected light LR by an external proximity object and thus acquires a photo-detection signal on such an object hereinbefore, the application is not limitedly applied to such a case. In other words, for example, a photo-detection signal of an external proximity object may be acquired through detecting a shadow of the object caused by outside light instead of detecting the reflected light LR by the external proximity object.

Furthermore, a series of processing described in the embodiments and the like may be performed by hardware or software. In the case that the series of processing is performed by software, a program configuring the software is installed in a general-purpose computer or the like. Such a program may be beforehand recorded in a recording medium built in a computer.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information input device comprising:
   an input panel having an effective photo-detectable region in which a plurality of photodetectors are arranged for detecting an external proximity object, and having a shading region located in a margin of the effective photo-detectable region;
   a correction section performing outermost-region correction by increasing intensity of an outermost photo-detection signal obtained from a photodetector located in an outermost-region of the effective photo-detectable region; and
   an image processor acquiring object information about one or more of a position, a shape and size of the external proximity object based on a resultant photo-detection signal obtained from the outermost-region correction,
   wherein the input panel is an input/output panel including the plurality of photodetectors and a plurality of display elements in an effective display region which is defined as the same region as the effective photo-detectable region, and
   the correction section performs in-plane correction to the photo-detection signals from the photodetectors with use of an in-plane correction table in which a correspondence between an in-plane correction factor and a position within the effective photo-detectable region is defined, the in-plane correction factor having in-plane distribution in accordance with both of in-plane intensity distribution of light emitted from the effective display region and in-plane photo-sensitivity distribution of the plurality of photodetectors; and
   wherein the in-plane distribution of the in-plane correction factor corresponds to an inversion of composite distribution of the in-plane intensity distribution of light and the in-plane photo-sensitivity distribution, and the correction section performs the in-plane correction through multiplying a photo-detection signal from each of the photodetectors by the corresponding in-plane correction factor.

2. The information input device according to claim 1, wherein the input panel has an irradiation light source emitting detection light for detecting the external proximity object.

3. The information input device according to claim 2, wherein the detection light is infrared light.

* * * * *